United States Patent [19]

Bliesner

[11] Patent Number: 5,544,847
[45] Date of Patent: Aug. 13, 1996

[54] LEADING EDGE SLAT/WING COMBINATION

[75] Inventor: Wayne T. Bliesner, Snohomish, Wash.

[73] Assignee: The Boeing Company, Seattle, Wash.

[21] Appl. No.: 150,374

[22] Filed: Nov. 10, 1993

[51] Int. Cl.$^6$ .................... B64C 3/50; B64C 9/22
[52] U.S. Cl. .......................... 244/214; 244/216
[58] Field of Search .................. 244/214, 213, 244/216

[56] References Cited

U.S. PATENT DOCUMENTS

| | | | |
|---|---|---|---|
| 4,360,176 | 11/1982 | Brown | 244/214 |
| 4,399,970 | 8/1983 | Evans | 244/214 |
| 4,650,140 | 3/1987 | Cole | 244/214 |
| 4,752,049 | 6/1988 | Cole | 244/214 |
| 4,753,402 | 6/1988 | Cole | 244/214 |

FOREIGN PATENT DOCUMENTS

| | | | |
|---|---|---|---|
| 0100775 | 2/1984 | European Pat. Off. | |
| 0291328 | 11/1988 | European Pat. Off. | |
| 3643157 | 7/1987 | Germany | 244/214 |
| 1572004 | 7/1980 | United Kingdom | 244/214 |
| 2137569 | 10/1984 | United Kingdom | 244/214 |

*Primary Examiner*—Andres Kashnikow
*Assistant Examiner*—Virna Lissi Mojica
*Attorney, Agent, or Firm*—Robert B. Hughes

[57] ABSTRACT

A leading edge slat wing combination where the slat is mounted to a pair of circularly curved carrier tracks positioned within the outer surface contour of the fixed wing. In moving from the cruise configuration to the take-off and climb configuration and thus to the fully deployed landing configuration, the slat has a fixed angular orientation relative to the carrier track. This eliminates the need for auxiliary track assemblies of the prior art that are used in addition to the carrier tracks to change the angular position of the slat for the high lift configuration. Also, in two embodiments, the slat, in the take-off and climb configuration, forms a gap or slot with the fixed wing, and the gap or slot is sealed in the vicinity of the carrier tracks. The arrangement of the present invention is produced by a design technique of identifying design envelopes or areas for certain surface areas and locations of elements of the slat and fixed wing, and then properly matching the configuration and movement of the components within these design envelopes to arrive at an optimized configuration where the curved carrier tracks can be used while being fixedly attached to the slat.

29 Claims, 17 Drawing Sheets

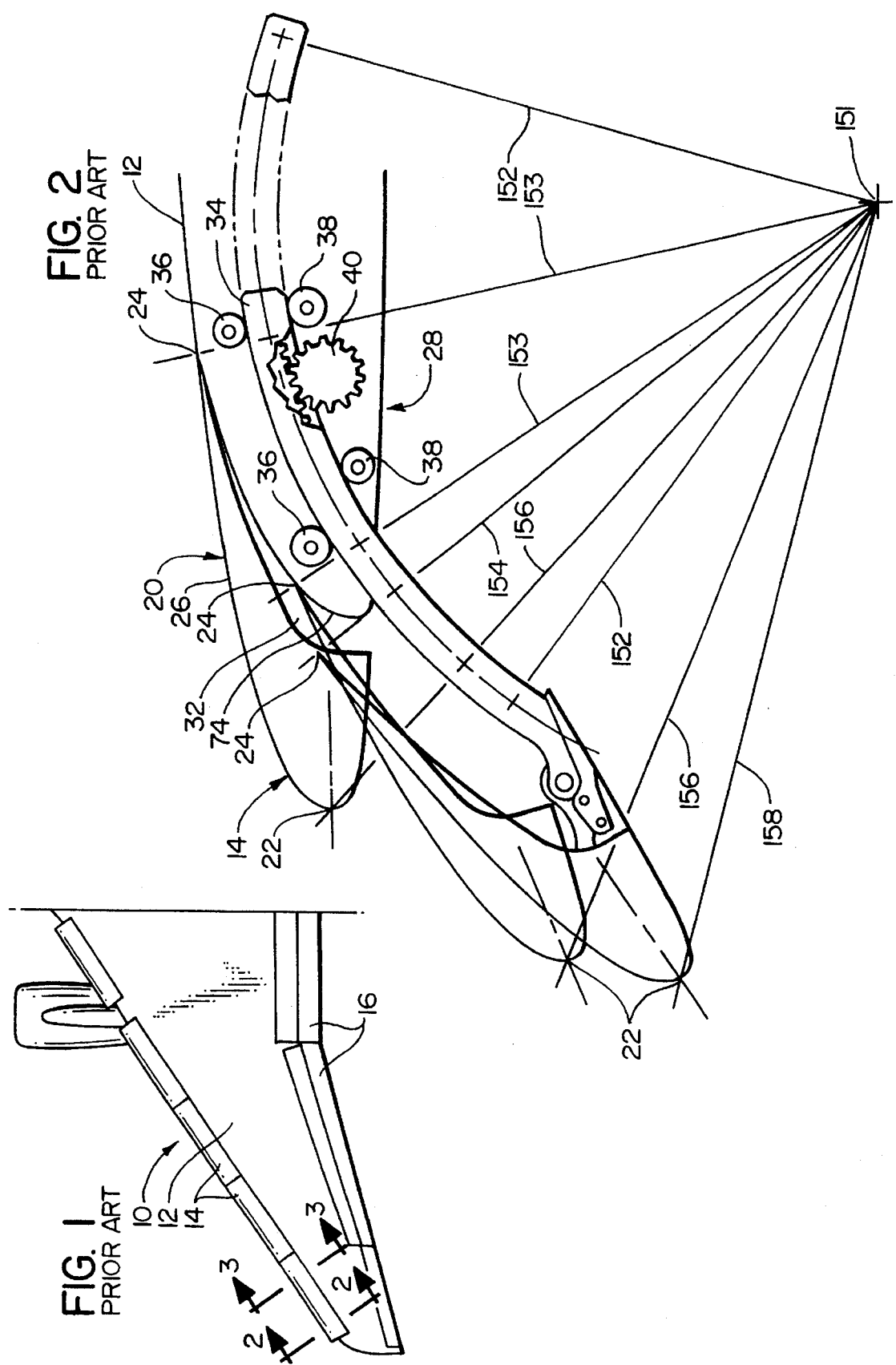

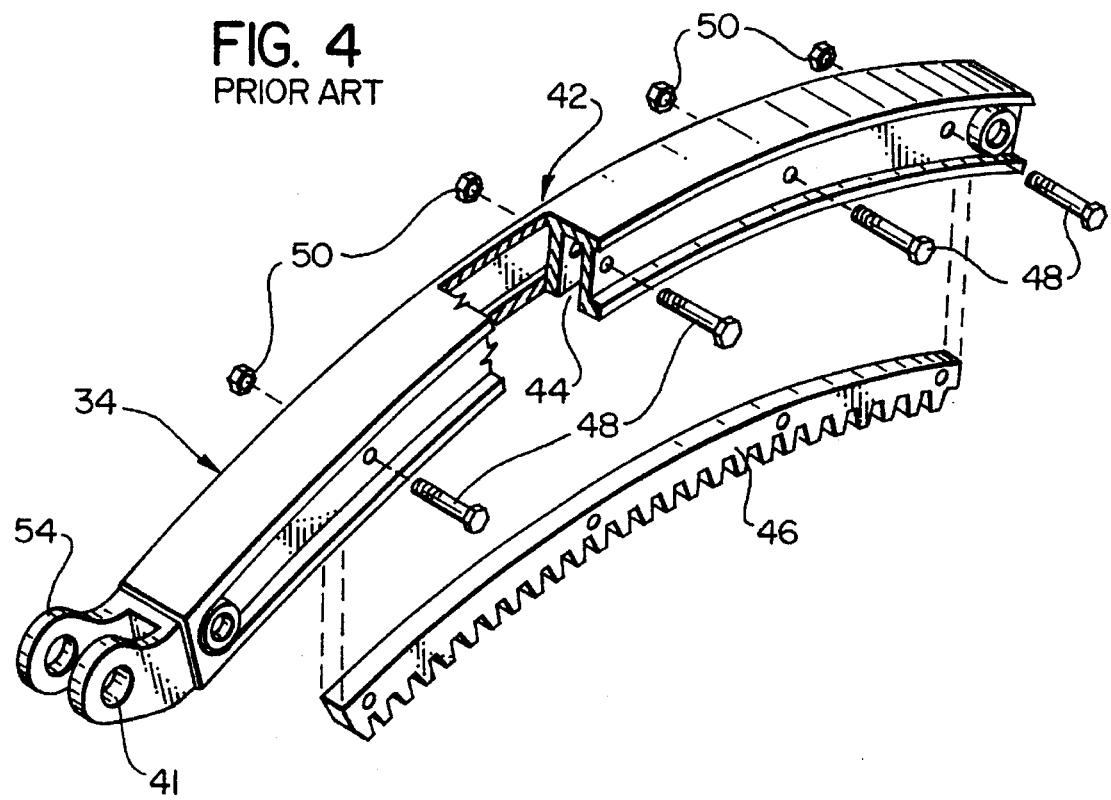

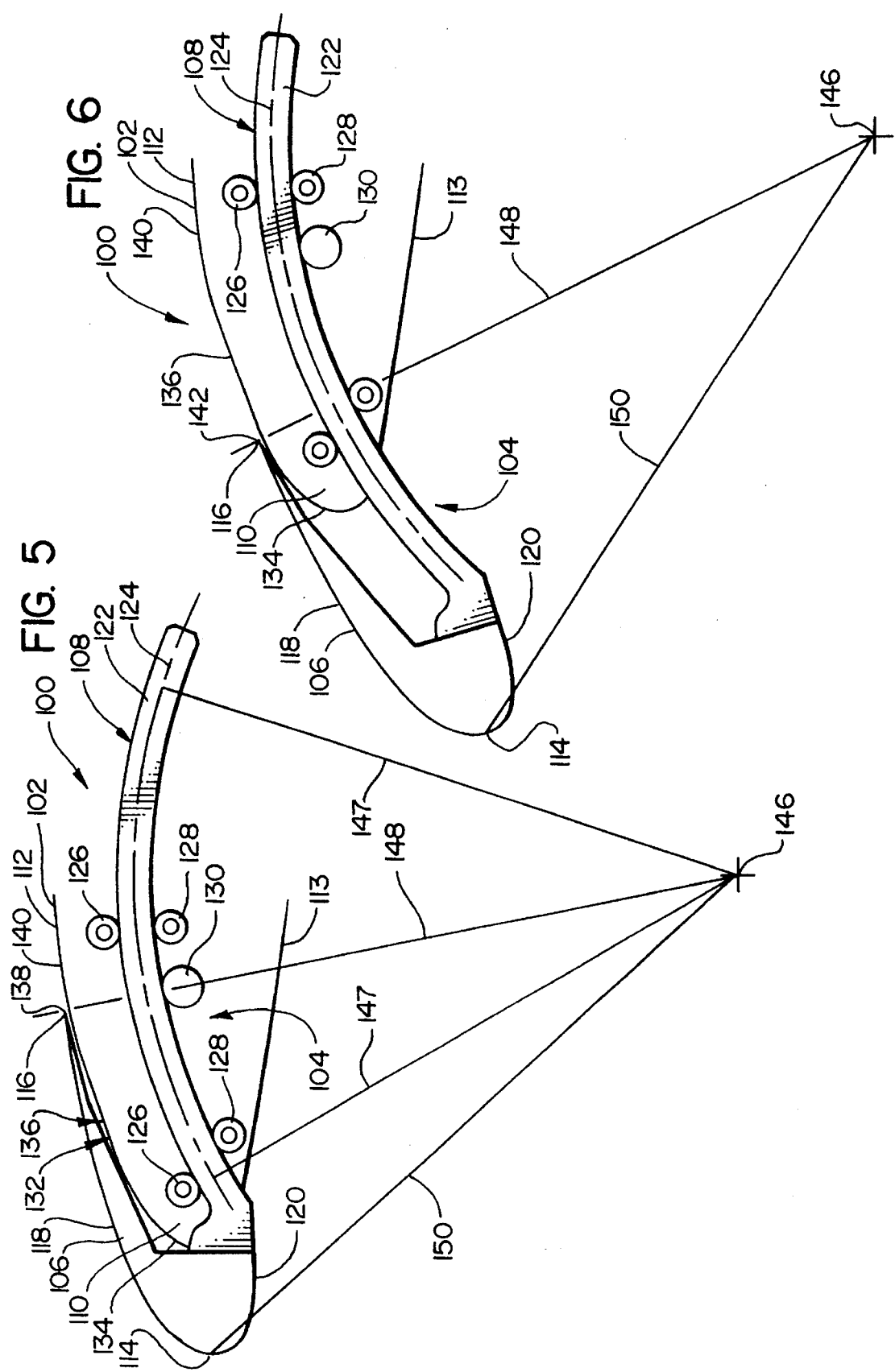

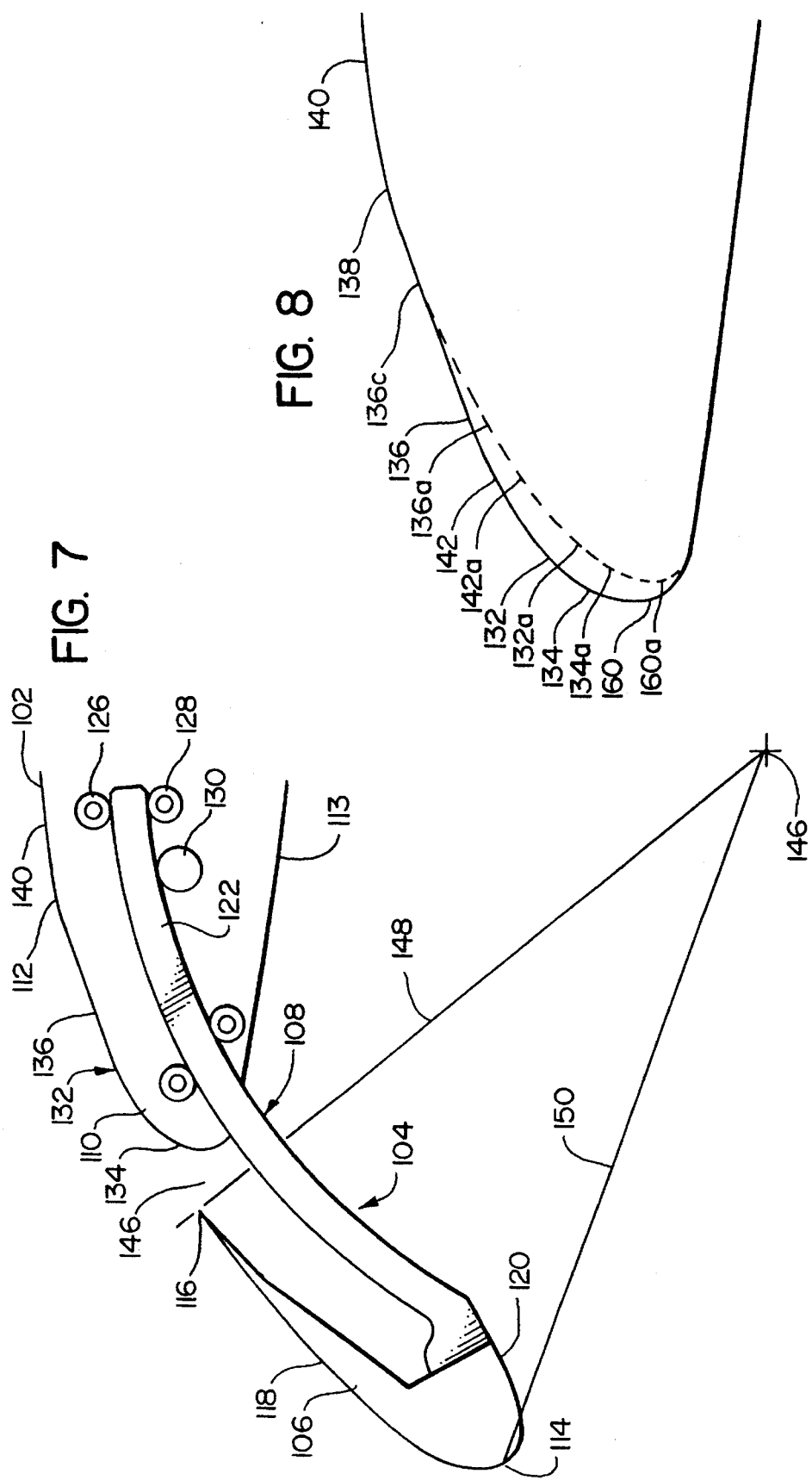

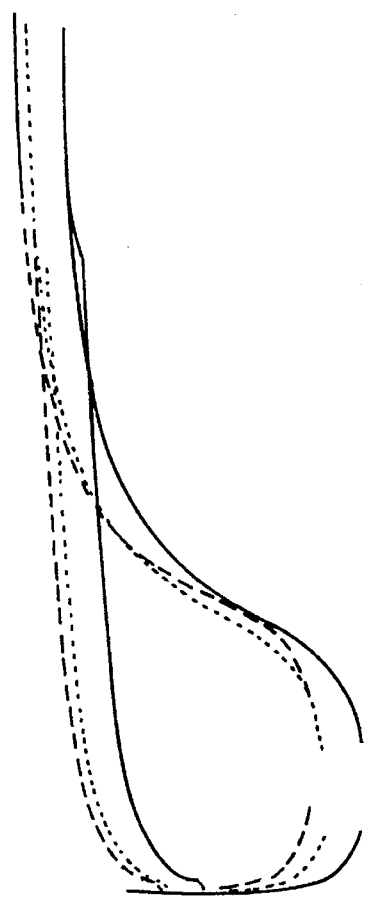
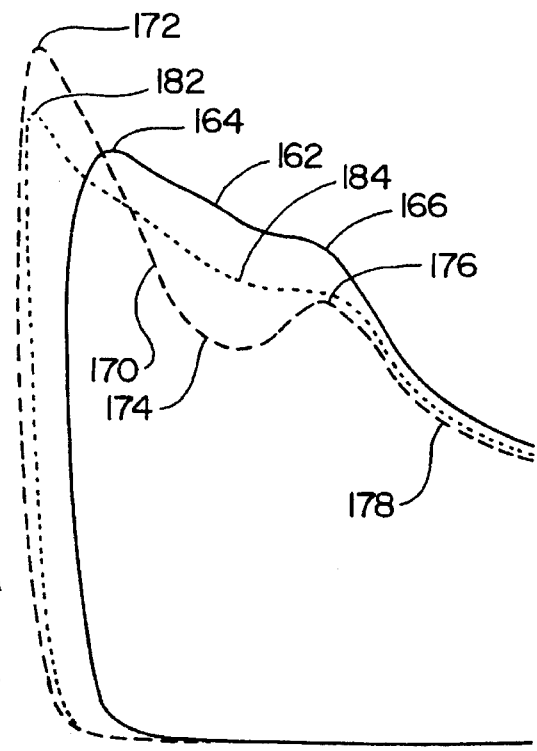
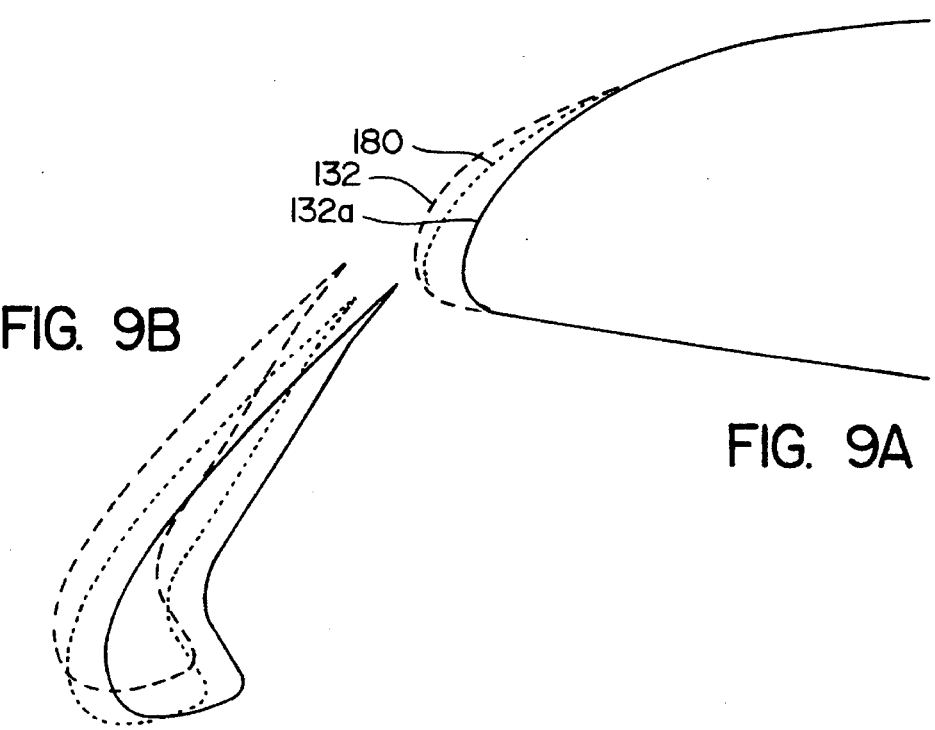

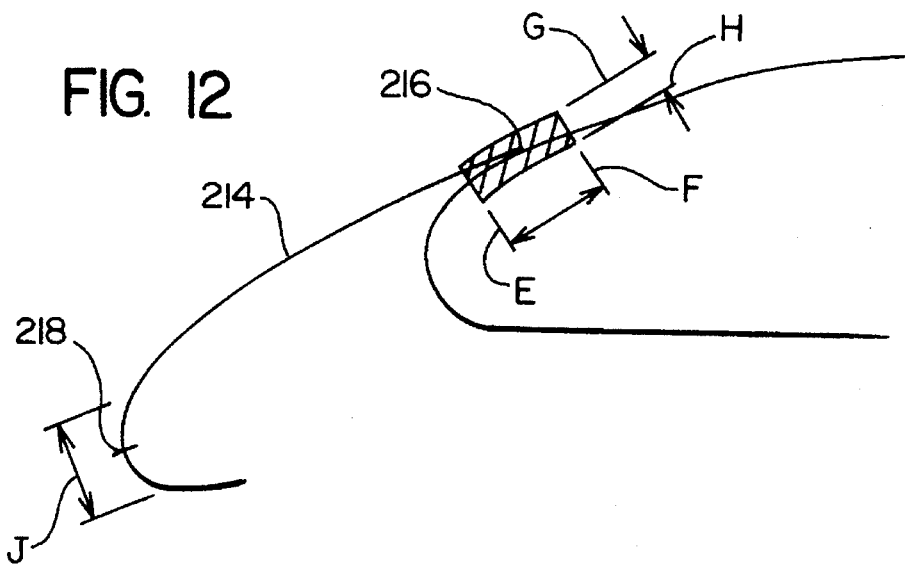
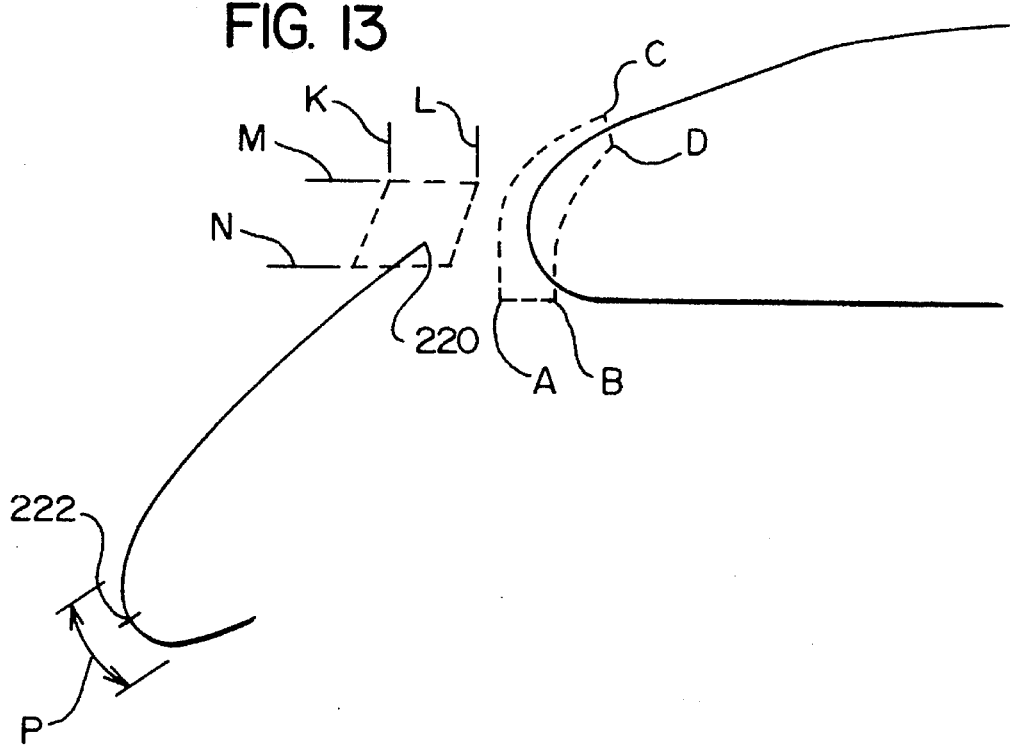

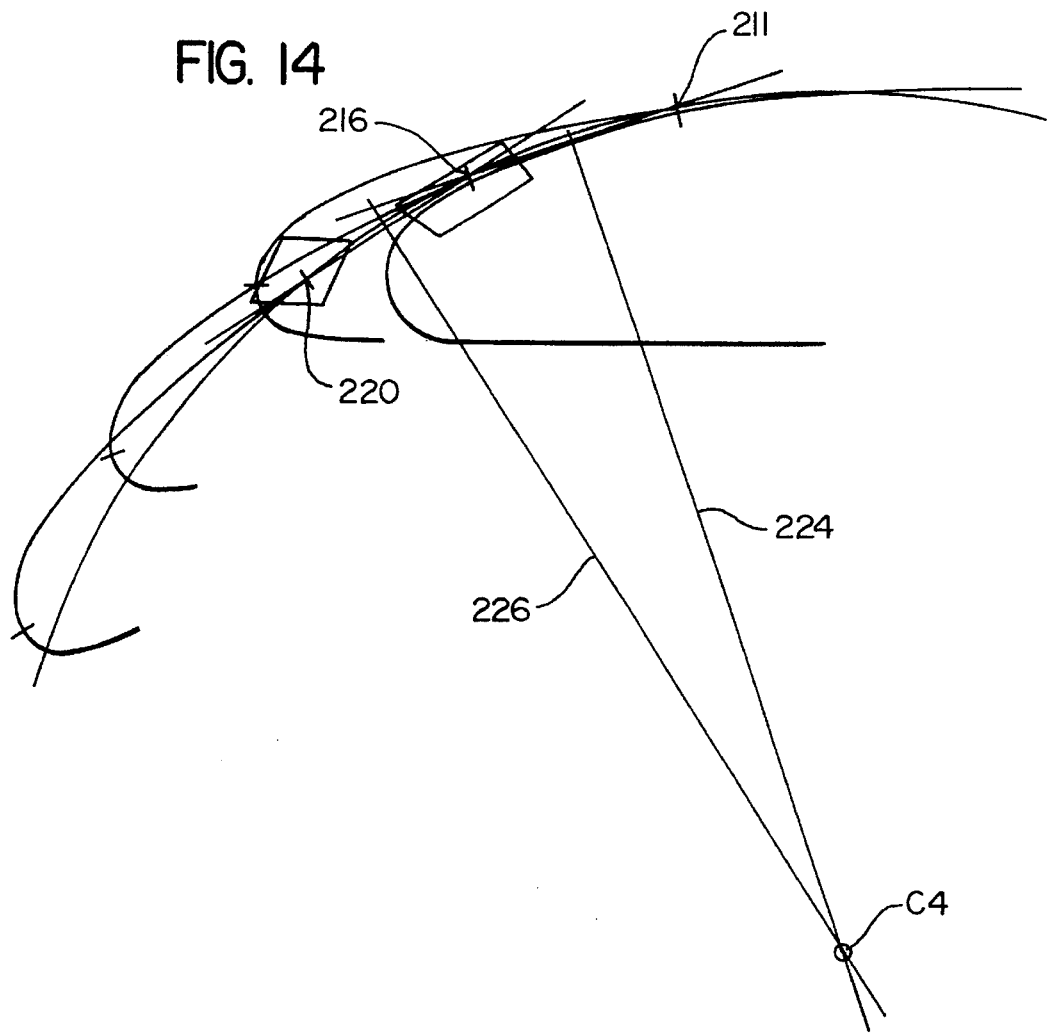

LEADING EDGE SLAT/WING COMBINATION

FIELD OF THE INVENTION

The present invention relates to a slat/wing combination, and also to a method of designing and utilizing the same, and more particularly to a leading edge slat fixed wing combination and method where there are carrier tracks that move the leading edge slat from its cruise position to its intermediate take-off position and to its high lift position.

BACKGROUND OF THE INVENTION

It has long been a practice to provide aircraft wings with leading edge and trailing edge devices which are mounted to a fixed wing structure. In the cruise configuration, these leading and trailing edge devices are in retracted position to provide with the fixed wing an optimized aerodynamic configuration.

For take-off and climb, these leading and trailing edge devices are generally moved toward intermediate positions which optimize performance of the wing during the take-off and climb, where improved lift performance is needed, but drag still needs to be kept within reasonable limits. The third operating configuration is the high lift position, where the leading and trailing edge devices are fully deployed to provide adequate lift at relatively low speeds. This high lift configuration is commonly used when the aircraft is landing.

Leading edge devices are commonly in the forms of slats which in the cruise configuration conceal the forward and upper forward surface portion of the wing, with the leading edge of the slat forming the leading edge of the wing/slat combination in cruise configuration. The trailing edge of the leading edge slat is positioned immediately adjacent to the upper surface of the fixed wing so that it forms, as much as possible, a continuous upper aerodynamic surface for the slat/wing combination in the cruise configuration.

In the take-off and climb configuration, the slat is moved forward to an intermediate location to extend the effective cord length of the wing, and is also generally angled downwardly to some extent to increase the camber of the wing. In some instances, it is desirable to have the trailing edge of the slat be positioned to be in contact with the upper forward fixed wing surface portion to form a continuous upper aerodynamic surface of the slat/wing combination. However, in some arrangements a slot is formed between the slat and the forward portion of the fixed wing in the take-off position.

In the high lift configuration, the slat is generally moved further forwardly from the takeoff and climb position so that the slat has a yet greater downward slant so as to increase the camber of the slat/wing combination, and also so that the slat forms with the fixed wing an aerodynamic slot which results in airflow from beneath the slat upwardly through the slot and over the upper forward surface portion of the fixed wing.

For at least the past three decades, one common way for providing leading edge slat assemblies has been to use an arcuately shaped carrier track that moves along its length in a circularly curved arcuate path from the cruise position, through the intermediate take-off and climb position to the high lift landing position. Among the aircraft which have used and still use this particular arrangement for the leading edge slat are the Boeing 727, 737, 757 and 767.

Such slat assemblies comprise a main arcuately shaped carrier track having a forward end to which the slat is pivotally mounted, with this carrier track moving in an arcuate path between rollers that maintain the travel of the carrier track along this fixed arcuate path. In the earlier 727 configuration, the slat was fixedly attached to the carrier track and formed a slat or gap with the fixed wing at both the takeoff and climb position and also in the high-lift landing position. In the later 737, 757 and 767 configurations in addition to the carrier track, there was provided an auxiliary track subassembly where there is a moveable arm member having its forward end fixedly attached to the slat, with the rear end of the arm member being positioned in a contoured groove of a stationary guide member.

In the 737, 757 and 767, as the slat moves from the cruise position to the intermediate takeoff position, the carrier track is arranged so that the trailing edge of the slat is in engagement with (or at least in close proximity to) the fixed wing upper leading edge surface portion. However, for the high lift landing configuration, in order to properly position the slat to optimize performance relative to lift and other characteristics at the slower speed, the slat needs to be rotated to a position that requires angular movement of the slat relative to the carrier track. This is accomplished by arranging the groove in which the rear end of the positioning arm travels so that it slants in a more forward direction to cause the trailing edge of the slat to tilt further upwardly as the slat is carried further forwardly and downwardly to its high lift position.

Over the years, there have been various improvements or proposed alternative designs in this particular type of leading edge slat assembly. Two of these are shown in patents assigned to The Boeing Company, one being U.S. Pat. No. 4,471,928 (Cole), which discloses an improved configuration for the carrier track, where the carrier track is a slotted I beam defining a U shaped slot along its lower length. A gear rack is mounted within the carrier track slot and a pinion gear meshes with the gear rack to move the carrier track along its arcuate lengthwise axis. The other is U.S. Pat. No. 4,469,297 (Cole) which has the same basic arrangement of a carrier track, bun to drive the track member there is a cable and drum arrangement. The cable extends around the drum, with the ends of the cable being attacked to forward and rear ends of the carrier track.

SUMMARY OF THE INVENTION

The slat/fixed wing combination of the present invention comprises a fixed wing having a leading edge portion, an upper surface comprising a concealed forward nose and upper surface portion, and a main upper surface portion located rearwardly of the concealed forward nose and upper surface portion, and also a lower surface.

There is a slat having a leading edge, a trailing edge, and a forward and upper surface portion extending from said leading edge to said trailing edge. The slat is mounted to the leading edge portion of the fixed wing in a manner to be movable between three positions, namely:

a. a first cruise position where the slat is immediately adjacent to the fixed wing leading edge portion to conceal said forward nose and upper surface portion;

b. a second intermediate take-off/climb position where the slat is located forwardly of the cruise position and the trailing edge of the slat is in contact with or closely adjacent to he forward concealed nose and upper surface portion; and c. a third high lift position where the slat is moved forwardly and downwardly from the second position, with the trailing edge of the slat forming an aerodynamic high lift gap with the leading edge portion of the fixed wing.

The fixed wing has a fixed wing outer contour envelope contained within said upper and lower surfaces of the fixed wing.

There is a slat actuating mechanism comprising a substantially circularly curved carrier track means having a forward end to which the slat is mounted with a substantially fixed angular orientation relative to said track means. The track means has an arcuate lengthwise track axis extending in a substantial curve along said track means. The track means is mounted for movement along the track axis from a rear track position where the flap is positioned in the first cruise position, to an intermediate track position where the slat is positioned in the second intermediate position, and a forward track position where the slat is located in the third high lift position.

The track means has a track structural and operating envelope having a maximum width dimension generally perpendicular to the lengthwise axis and a maximum length dimension extending along the lengthwise track axis. The track means is arranged relative to the outer surface contour envelope of the fixed wing in a manner that in the cruise position, the track structural envelope is positioned substantially entirely within the outer surface contour envelope of the fixed wing.

With regard to certain additional features of the present invention, the lengthwise axis of the carrier track means has a center of curvature for the track means. The trailing edge of the slat has three trailing edge point locations at the first, second, and third positions of the slat that define a trailing edge arcuate path of travel for the trailing edge of the slat, which trailing edge arcuate path has a center of curvature for the slat trailing edge path of travel. A leading edge point of the slat has three leading edge point locations at the first, second and third positions of the slat. The three leading edge locations of the slat define a leading edge arcuate path of travel having a center of curvature of the path of travel of the leading edge of the slat. The slat/fixed wing combination is arranged so that the center of curvature of the track, the center of curvature of the slat trailing edge path of travel, and the center of curvature of the slat leading edge path of travel are all coincident.

In one embodiment, in the second intermediate position, the slat trailing edge is positioned in sealing relationship with the concealed forward nose and upper surface portion.

In another embodiment, the slat in the second intermediate position has its trailing edge spaced from the concealed forward nose and upper surface portion to form an aerodynamic take-off/climb position gap. There is also a gap closure means at a location of the slat actuating mechanism at the take-off/climb gap. The gap closure means is arranged so that with the slat in the second position, the gap closure means closes a portion of the aerodynamic take-off/climb gap at the location of the slat actuating mechanism.

In one arrangement of the gap closure means, there is a raised surface portion of the concealed forward nose and upper surface portion of the fixed wing. In another arrangement, the gap closure means comprises an extension of the slat at the slat trailing edge at the location of the actuating mechanism.

With regard to the preferred configuration of the concealed forward nose and upper surface portion, with the slat in the first cruise configuration, the slat/fixed wing combination has vertical thickness dimensions extending from a lower exposed surface of the slat/fixed wing combination to the forward and upper surface portion of the slat. The leading edge portion of the fixed wing is configured to have vertical thickness dimensions extending from the lower surface of the slat/fixed wing combination upwardly to the concealed forward nose and upper surface portion of the fixed wing, in amasser that the vertical thickness dimensions of the forward portion of the leading edge portion of the fixed wing is greater than corresponding vertical thickness dimensions at corresponding locations of prior art slat/wing combinations of Boeing 727, 737, 757 and 767 airplanes made prior to Sep. 1, 1993. Also, the nose surface portion of the forward and upper concealed portion of the fixed wing is positioned forwardly relative to a lengthwise dimension of the slat, in comparison to the slat/wing combinations of the Boeing 727, 737, 757 and 767 airplanes.

More specifically, the leading edge portion of the fixed wing has a horizontal lengthwise dimension extending from a most forward nose surface portion of the leading edge portion of the fixed wing in a cordwise direction to a location of the trailing edge of the slat in the first cruise configuration. There is a first vertical thickness dimension of the fixed wing at a first vertical thickness location which is spaced from the most forward nose surface portion of the fixed wing rearwardly 12½% of the horizontal lengthwise dimension, the first fixed wing vertical dimension being at least as great as 63% of the total vertical thickness dimension of the slat/wing combination at this first vertical thickness location. Also, the vertical thickness dimension of the fixed wing at the first vertical thickness location is no greater than about 76% of the vertical thickness dimension of the slat/fixed wing combination at the first vertical thickness location. A second vertical thickness dimension of the fixed wing is 25% rearwardly of the most forward nose surface portion, and is at least as great as 77%, and no greater than 83% of the total vertical thickness dimension at that location.

Also, in accordance with the preferred form of the present invention, the concealed forward nose and upper surface portion of the fixed wing is shaped aerodynamically so that with the slat in the third high lift position, pressure over the concealed forward nose and upper surface portion is at a peak negative pressure at a most forward location of the concealed forward nose and upper surface portion, and is at a lower negative pressure peak at a most rear location of the concealed forward and upper surface portion. Along the forward half of the concealed forward and upper surface location there is a greater negative pressure drop than over the latter half.

In the preferred form, the negative pressure curve over the concealed forward nose and upper surface portion at the halfway location drops below the negative pressure at the rear most location of the concealed forward nose and upper surface portion.

In the method of the present invention, there is first provided a slat/fixed wing combination comprising the main components described above, namely a fixed wing, a slat having the three operating positions, and the slat actuating mechanism. The method then comprises defining for the concealed forward nose and upper surface portion a design tolerance envelope within which the concealed forward and upper surface portion can be positioned and contoured for proper performance.

Also, the method comprises the finding for each of the leading edge and trailing edge of the slat design tolerance envelopes in which the leading edge and trailing edge of the slat can be positioned in the first, second and third positions.

The carrier track means is positioned in a manner that a center of curvature of the track axis is at a center location area and the track structural and operating envelope is located within the fixed wing outer contour envelope. Then the slat is so positioned that in being moved by the carrier track means from the first to the second and to the third positions, both the leading edge and the trailing edge of the slat are within their respective design tolerance envelopes at the first, second and third positions, and the arcs defined by the paths of travel of the leading edge and the trailing edge of the slat have centers of rotation within the center location areas and coincident with the center of the track axis.

Also, the concealed forward and upper surface portion of the fixed wing is contoured within its design tolerance envelope in a manner to provide proper aerodynamic performance of the slat/fixed wing combination with said slat in the first, second and third positions.

Other features will become apparent from the following detailed description.

BRIEF DESCRIPTION OF THE DRAWINGS

FIG. 1 is a top plan view of a wing of an aircraft incorporating a prior art leading edges slat/wing combination;

FIG. 2 is a sectional view taken along line 2–2 of FIG. 1, illustrating the actuating mechanism of the 737, 757, and 767 prior art slat/wing combination;

FIG. 4 is an isometric exploded view of a carrier track used in the prior art slat/wing combination, as illustrated in U.S. Pat. No. 4,471,928;

FIG. 5 is a transverse sectional view, similar to FIG. 2, showing the leading edge slat/wing combination of a first embodiment of the present invention, with the slat in its retracted cruise position;

FIG. 6 is a sectional view similar to FIG. 5, but showing the slat having been moved to its intermediate take-off/climb position;

FIG. 7 is a sectional view similar to both FIGS. 5 and 6, except with the slat being shown in its third high lift position;

FIG. 8 is a sectional view showing in solid lines the forward nose and upper surface portion of the fixed wing, and for purposes of comparison showing in a broken line the prior art contour of the forward nose and upper surface of the fixed wing of the typical prior art slat/wing combination such as incorporated in the Boeing 727, 737, 757 and 767;

FIG. 9A is a sectional view taken along a cordwise plane showing surface contours of the nose portion of a fixed wing, illustrating the prior art configuration, the preferred configuration of the present invention, and a third configuration of a less preferred arrangement;

FIG. 9B is similar to FIG. 9A, showing the leading edge slat in its high lift position at three different locations, corresponding to the preferred location for each of the fixed wing contours shown in FIG. 9A;

FIG. 9C shows three pressure curves over the fixed wing forward nose and upper forward surface portion, for each of the surface contours shown in FIG. 9A;

FIG. 9D is a figure similar to 9C, but showing the pressure curves for the three slat positions shown in FIGS. 9B;

FIGS. 11 through 17 are somewhat schematic drawings of the slat/fixed wing combination as it is being designed in accordance with the teachings of the present invention, with these steps showing the sequence of the analysis.

FIG. 11 is a somewhat schematic view illustrating the outside surface contours of the fixed wing and the leading edge slat in three different locations, and also illustrating design envelopes of the center line of the carrier track, and also the forward nose and upper surface contour of the fixed wing;

FIG. 12 is a schematic view similar to FIG. 11, with the slat in its take-off/climb position, showing the design tolerance envelopes for the trailing edge and leading edge of the slat in that position;

FIG. 13 is a view similar to FIG. 12, showing the slat in its high lift position, and also showing the design tolerance envelopes and/or limits of the trailing edge and leading edge of the slat;

FIG. 14 is a view similar to FIGS. 11–13, illustrating the slat in three different positions, and also illustrating the method of determining the center of curvature for the path of the trailing edge of the slat in moving between its three operating positions;

FIG. 15 is a view similar to FIG. 14, but showing the center of curvature for the path traveled by the leading edge of the slat;

FIG. 16 is a view showing the slat/fixed wing combination of FIG. 5, and placing the representation of FIG. 15 on that representation of FIG. 5 as an overlay, with certain arcuate paths of travel being illustrated for purposes of analysis;

FIG. 17 is a sectional view identical FIG. 2, and illustrating, for purposes of comparison, certain centers of curvature and centers of rotation of the prior art arrangement of FIG. 2;

DESCRIPTION OF THE PREFERRED EMBODIMENTS

Figure 3:
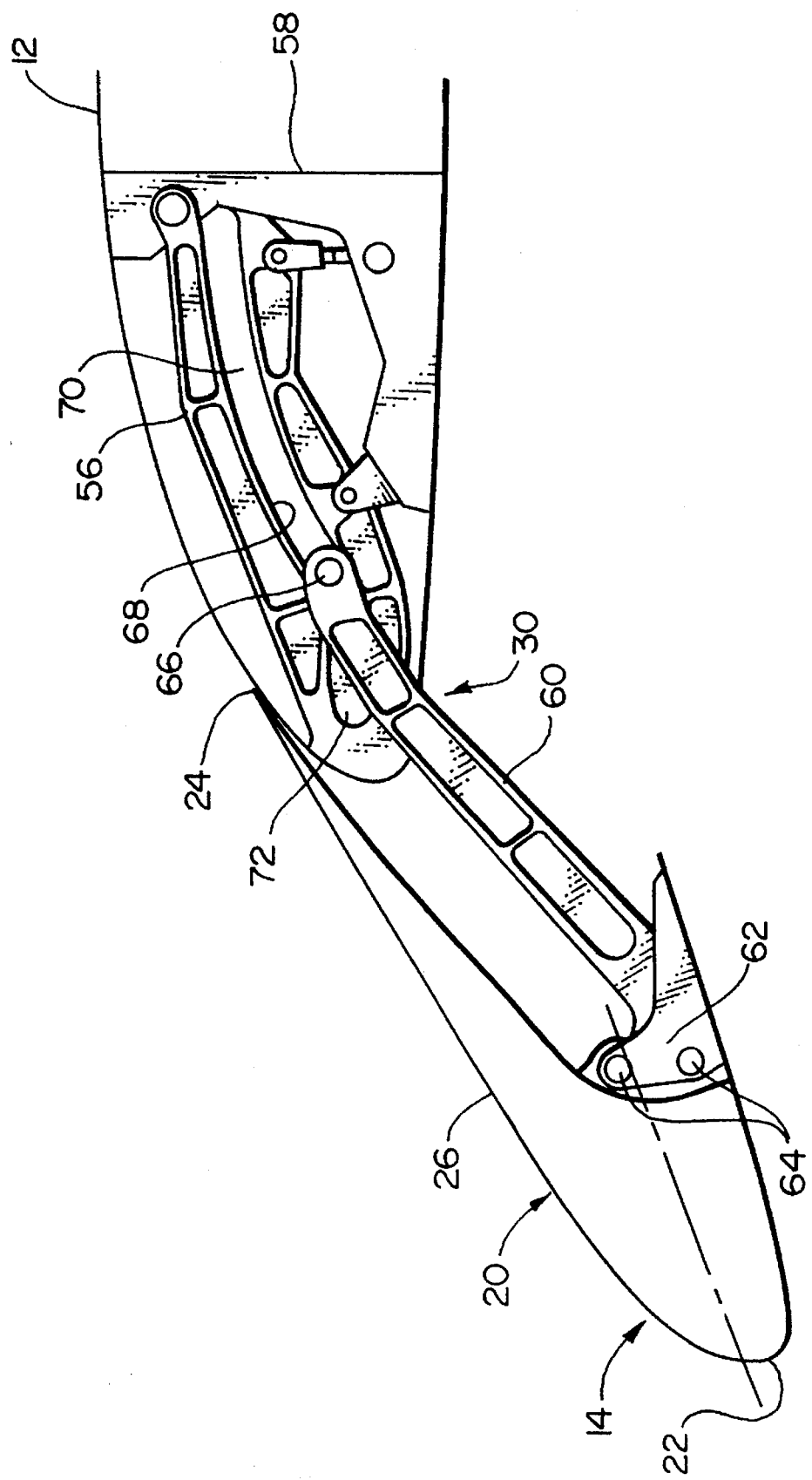
FIG. 3 is a sectional view taken along line 3–3 of FIG. 1, showing a positioning arm of the prior art slat/wing combination, with the slat in its intermediate take-off/climb position.

It is believed that a clearer understanding of the present invention will be achieved if certain background information is initially presented concerning the overall state of the art relating to the manner and sequence in which airplanes are designed, and in particular to the way the design of leading edge slat/wing combinations are accomplished.

In recent decades, the design of larger modern day aircraft (such as larger commercial jet aircraft) has become increasingly complex. Over the last several decades, a common procedure in the aircraft industry is initially to conduct a marketing and business analysis to arrive at the overall characteristics of an aircraft design that has good prospects of becoming a commercially successful product over the next couple of decades or so. Such an analysis would entail examining aircraft routes with regard to distance, number of passengers expected, airport requirements (e.g. landing and take-off distances), load capacity, cost of manufacture, operating expenses, etc. From these studies, they will arrive at a very general concept of an airplane that would fill an expected niche in the marketplace. At the same time that this study is going on, these factors must be analyzed in conjunction with the state of the art as to what the present day technology (along with the expected improvements over the next few years) could provide to meet the requirements of the optimized airplane to fit this niche.

If this overall concept of the airplane shows sufficient promise, then it is given to a design group (sometimes called "preliminary design" or "product development") to arrive at a general configuration of an airplane that would match this broad concept of the desired airplane. The finished product that would come out of this preliminary design group would identify the overall configuration and components of the airplane, and also its basic aerodynamic contours. For example, for the wing configuration, the basic aerodynamic configuration of the wing in its cruise configuration would be identified, and the arrangements of the leading and trailing edge devices would also be identified at least in outline form. More specifically, the basic contour of the leading edge device would be specified, and then its position relative to the fixed wing would also be identified for different operating positions. Also, a certain amount of aerodynamic analysis and wind tunnel testing would have been done to arrive at these optimized designs.

Even at this stage, there is sometimes specialization between two groups of aerodynamicists, namely a first group that is concerned with the basic configuration of the wing in its cruise configuration, and a second group that is concerned with arranging this basic wing configuration into components of the leading edge and trailing edge slats or flaps. The latter involves fitting these together in a manner that could be compared to assembling the pieces of a jigsaw puzzle, and then moving those out to their deployed positions at takeoff and also for landing.

Some time after the decision has been made to incorporate this design in an actual commercial airplane, the task is given to the "project" to translate this conceptual design into actual hardware. With regard specifically to the construction and design of the wing, it becomes necessary to devise actuating mechanisms that will properly move and position the leading edge devices in their various operating locations, and provide sufficient support structure to meet all the operating requirements, such as being able to withstand expected aerodynamic loads, etc.

Some decades ago (at least as early as the design of the 727 airplane which took place in the late '50s and early 1960s), it was determined that a desirable way to deploy a leading edge slat was to mount the several slats on carrier tracks having an arcuate configuration. The carrier tracks are in the cruise configuration placed substantially entirely within the outside contours of the overall wing, with each of these carrier tracks being positioned between upper and lower rollers that permit the carrier track to be extended and retracted. With the overall arrangement and arcuate configuration of the carrier track, the motion of the slat (i.e. from the cruise position to the intermediate take-off and climb position and then to the high lift position for landing), was such that the slat was carried forwardly and downwardly, with the downward component of travel increasing as the slat was moved further outwardly from the fixed wing. In the 727 airplane the slat was fixedly attached to the carrier track so as to have a fixed angular orientation relative to the track. In the take-off/climb position, the trailing edge of the slat formed a gap with the fixed wing. To improve aerodynamic performance, in the 737 and following the carrier track was arranged so that the slat in the take-off/climb position was eliminated, and then the angular position of the slat was changed by a greater degree at the high lift position for landing. This was accomplished by mounting the slat pivotally to the forward end of the carrier track and then providing an auxiliary track to change the angle of the slat as it approached the high lift position.

This prior art method utilized in the 737 airplane will now be described with reference to FIGS. 1, 2 and 3, which show generally the system utilized also in the Boeing 737, 757 and 767. In FIG. 1, there is shown a top plan view of a wing 10 comprising a main fixed wing 12, a plurality of leading edge devices 14 and trailing edge devices 16. With reference to FIGS. 2 and 3, it can be seen that each leading edge device 14 comprises a slat 20 having a leading edge 22, a trailing edge 24, and an upper aerodynamic surface 26 extending from the leading edge 22 to the trailing edge 24. The actuating system for each slat 20 comprises two carrier track assemblies 28 (one of which is shown in FIG. 2) and two auxiliary track assemblies 30 (one of which is shown in FIG. 3). The carrier track assemblies 28 function to move the slat 20 from the cruise configuration to the take-off position and also to the high lift position for landing. The auxiliary track assemblies 30 function to control the slant of the slat 20 at its various locations. More specifically, the auxiliary track assemblies 30 function to rotate the slat 20 to a greater downward slant as the slat 20 moves into its high lift position in a manner to move the trailing edge 24 further away from the fixed wing so as to properly form a slot 32.

The carrier track assembly 28 comprises an arcuately curved carrier track 34 which in the preferred embodiment is circularly curved. This track 34 is positioned by a pair of upper rollers 36 and a pair of lower rollers 38. In this particular arrangement, the track 34 is moved along its lengthwise axis by means of a pinion gear 40. The forward end of each carrier track 34 is pivotally connected at 41 to the slat 20.

One preferred arrangement of this prior art carrier track 34 is described more completely in the aforementioned U.S. Pat. No. 4,471,928, and (except for the numerous designations) FIG. 4 of that patent has been copied identically from that patent and is presented in this patent application as FIG. 4. It can be seen that the carrier track 34 comprises an elongate beam structure 42 which defines a downwardly facing elongate U shaped slot 44, in which is positioned a gear rack 46. This gear rack 46 is held in place by a plurality of bolts 48 and corresponding nuts 50. At the forward end of the beam structure 42, there is a connecting portion 54 which provides the pivot connection 41 with the slat 20.

Reference is now made to FIG. 3 which shows the prior art auxiliary track assembly 30. This auxiliary track assembly 30 comprises a fixed auxiliary track structure 56 mounted to the forward spar 58 of the fixed wing 12 and a movable arm 60. This movable arm 60 has its forward end fixedly attached at 62 to the slat 20 (this being accomplished by being attached at upper and lower connecting locations 64). At the rear end of the arm 60, there is a roller 66 (only the pivot location of this roller being shown in FIG. 3) that moves in a contoured guide slot 68 defined by the aforementioned fixed track structure 58.

It can be seen with reference to FIG. 3 that the rear portion 70 of the guide slot 68 is circularly curved and extends downwardly at a curved forward and downward slant. The end portion 72 of the slot 68 departs from this circular curve so as to extend more forwardly and closer to a horizontal slant.

In FIG. 3, the slat 20 is shown at the intermediate take-off and climb position, and it can be seen that at this location, the roller 66 has moved almost entirely through the rear guide slot portion 70 and is about to enter into the end guide slot-portion 72. The effect of this is that as the flap is moved further toward the landing position, the rear end of the arm 60 moves in an upward and forward direction relative to the arc of the carrier track 34 so as to rotate the slat 20 about the pivot connection 41 of the carrier track 34 with the slat 20. The effect of this is to cause the leading edge 22 of the slat 20 to drop further downwardly and rearwardly, while raising the trailing edge 24 of the slat 20 further away from the forward upper surface portion 74 of the fixed wing 12.

As indicated previously, this general type of leading edge slat actuating system has been used successfully in various Booing planes dating from the 737 which was designed in the late '60s, on to the more recent 767 airplane. Various improvements have been made from time to time, such as the arrangement shown in the above mentioned U.S. Pat. No. 4,471,928.

By way of further background information, there are various practical constraints imposed on the design of the actual hardware of the leading edge devices. First, the basic design of the overall wing is dictated primarily by the desired aerodynamic contour for cruise configuration and also by structural considerations. The next consideration is then arriving at a configuration of the leading and trailing edge devices to be compatible with the aerodynamic and structural requirements for cruise configuration, and the optimized deployment positions of the leading and trailing edge devices for the various operating modes (i.e. the take-off and climb mode and the high lift landing mode primarily). One of the serious constraints is that the actuating mechanism for the leading and trailing edge devices would desirably fit totally within the contour of the outer envelope of the fixed wing, as dictated by the aerodynamic considerations at cruise. While this has in many instances not been possible with the trailing edge devices, this was successfully accomplished at least for the leading edge devices by the actuating mechanisms illustrated in FIGS. 1 through 4.

With the foregoing in mind, attention will now be directed to FIGS. 5 through 10 which illustrates a first embodiment of the present invention. The essence of the present invention is the recognition that there are various design elements or components in the fixed wing structure and in the leading edge slat assembly which, if combined properly, result in geometric relationships that dictate the movement of the actuating mechanism for the slat, such that by combining these with aerodynamically related elements within certain parameters to maintain a reasonably optimized design, the actuating system can in turn be simplified and improved.

More specifically, in the present invention, it has been found possible to make a modification to the basic prior art leading edge slat system described in FIGS. 1 through 4 so that the slat is fixedly attached to the arcuately curved carrier track members so that the carrier track members entirely determine not only the placement of the leading edge slat, but also its angular position, this being accomplished in a manner to achieve also desired aerodynamic performance. One of the main benefits of this is that it eliminates the need for the auxiliary positioning track assembly, while maintaining proper aerodynamic performance. Not only does this eliminate additional structure, but it also eliminates the need to make the additional openings in the fixed wing leading edge structure to accommodate the auxiliary track members.

Reference is initially made to FIGS. 5 through 8, which illustrate somewhat schematically the basic components of the first embodiment of the present invention. The slat/fixed wing combination of the present invention is generally designated 100 and comprises a fixed wing 102 and a slat assembly 104. (It is to be understood, of course, that commonly there would be a plurality of slat assemblies 104 for the fixed wing.) The slat assembly comprises a leading edge slat 106 and two slat actuating assemblies 108. The basic configuration of the fixed wing 102 is, or may be of conventional design, and it comprises a leading edge portion 110, a trailing edge portion (not shown for ease of illustration) and upper and lower aerodynamic surfaces 112 and 113, respectively. The slat 106 has a leading edge 114, a trailing edge 116, and an upper aerodynamic surface 118 extending from the leading edge 114 to the trailing edge 116. The slat 106 has a lower outer surface portion 120 which extends from the leading edge 114 a short distance rearwardly.

In the cruise configuration of FIG. 5, the lower surface portion 120 of the slat 106 forms a substantially continuous lower aerodynamic surface with the fixed wing lower surface 113. Each slat actuating assembly 108 comprises a main carrier track 122 which extends along an arcuate, circularly curved carrier track axis 124. The configuration of this carrier track 122 is, or may be, similar to (or substantially the same as) the prior art carrier track shown in FIG. 4 herein. Each actuating assembly 108 further comprises a pair of upper rollers 126 and a pair of lower rollers 128 positioned on upper and lower sides of the carrier track member 122, respectively. To drive the carrier track 122, there is provided a pinion gear 130, which is positioned on the lower or upper side of the track 122 and which engages teeth extending along the lower or upper side of the carrier track 122. The carrier track 122 may, as in the prior art track of FIG. 4, be made up of a separate beam structure and associated gear rack such as shown at 42 and 46, respectively, in FIG. 4. Also other features of the two prior patents, U.S. Pat. No. 4,471,928 and U.S. Pat. No. 4,469,297, could be included, and the information in these two patents is hereby incorporated by reference.

The leading edge location 114 of the slat 106 shall be considered as that location where the cord length of the slat/wing combination 100 meets the front surface of the slat 106, when the slat 106 is in the cruise configuration. The cord length shall be considered the maximum distance between the nose surface of the slat 106 in its cruise configuration to the farthest most trailing edge location of the entire wing combination with the trailing edge device in its cruise position.

The upper fixed wing surface 112 can be considered as having a concealed surface portion 132 comprising a front end nose concealed surface portion 134 and an upper concealed surface portion 136 extending rearwardly from the surface portion 134. When the slat 106 is in its cruise position of FIG. 5, the slat trailing edge 116 is positioned immediately adjacent to, and in contact with, the upper fixed wing surface 112 at a transition line 138 where the upper concealed surface portion 132 of the fixed wing meets a rear upper main surface portion 140, which is that portion of the upper portion 112 that extends rearwardly from the transition line 138. In the cruise position of FIG. 5, the upper aerodynamic surface 118 of the slat 106 forms a substantially continuous upper aerodynamic contour with the fixed wing upper main wing surface portion 140.

The intermediate take-off and climb position of the slat 106 is illustrated in FIG. 6. It can be seen that the carrier track 122 has moved forwardly to a position where the trailing edge 116 of the slat 106 is located at a second transition line 142 where the forward concealed portion 134 of the upper concealed contour 132 meets the rear concealed upper surface portion 136 of the fixed wing 102. In this position, the upper slat surface portion 118 forms a substantially continuous aerodynamic contour with the rear concealed surface portion 136 (with the surface portion 136 being exposed in the take-off and climb configuration of FIG. 6), and with the surface portion 136 in turn making a substantially aerodynamic contour with the rear main wing surface upper portion 140. Also, it can be seen that the leading edge location 114 of the slat 106 has been moved forwardly and downwardly from the cruise position of FIG. 5.

Reference is now made to FIG. 7 which shows the slat 106 in its high lift landing position. It can be seen that the carrier track 122 has been moved further along its axis 124 so that the slat 106 has moved forwardly and downwardly from the position of FIG. 6. Further, it can be seen that the slat trailing edge 116 has been moved out of contact with the concealed upper surface portion 132 so as to be spaced from the forward main wing surface portion 134 so as to form a slot 146 therewith. It can be seen that with the slat 106 being fixedly attached to the carrier track 122, the angular orientation of the slat 106 relative to the carrier track 122 has not changed.

With reference back to FIG. 5, it can be seen that the lengthwise axis 124 of the carrier track 22 has a radius of curvature having a center indicated at 146, with two radii lines being shown at 147. Thus, as the carrier track 122 moves from the position of FIG. 5 to the position of FIG. 6 to the high lift position of FIG. 7, the track member moves so that the axis 124 remains along an arc having a center point 146 as its center of rotation.

With further reference to FIG. 5, it can be seen that the trailing edge 116 of the slat 106 forms a second radius 148 extending from the edge 116 to the center 146. With reference to FIG. 6, it can be seen that the trailing edge 116 has moved to a position adjacent to the second transition line 142, and the radius line 148 extends from the point at the trailing edge 116 to the center point 146.

With reference to FIG. 7, with the slat 106 in its high lift position, it can be seen that the trailing edge 116 has moved to a location where the radius line 148 still remains at the same length. Each of these three positions of the slat rear edge 116 (in FIGS. 5, 6, and 7) is within the range of an optimized position for each of these three operating locations of the slat 106.

Similar radius lines 150 have been drawn in FIGS. 5, 6 and 7, extending from the slat leading edge location 114 to the center 146. As the slat leading edge location 114 moves from the cruise position of FIG. 5 through the position of FIG. 6 to the position of FIG. 7, it too moves about the same center of rotation 146.

To make a comparison with the typical prior art slat as shown in FIGS. 1 through 4, it can be seen from viewing FIG. 2 that there is a center location 151, and there are two radius lines 152 drawn from the center line of the carrier track 34 to the center 151 and two radius 153 drawn from the prior art slat trailing edge 24 at the cruise and high lift positions, and both of these have the center location at 151. However, it can also be seen that when the prior art slat 14 has moved to the high lift position, the trailing edge 24 has moved radially outwardly from the center location 151, so that the resulting line 154 drawn from the trailing edge to the center location 151 has a greater distance than the radius lines 153. The reason for this is that the design of the slat/fixed wing combination was such in the prior art that with the particular aerodynamic contour of the slat 24 and the fixed wing 12, and with the optimized positions of the slat 24 being dictated by the overall design, this change in angular position of the slat 20 relative to the center of rotation 151 became necessary.

Further, it can be observed, with further reference to FIG. 2, that the radius of the current path of travel of the leading edge 22 of the slat 20 remains substantially constant at 156 in traveling from the cruise position to the intermediate take-off and climb position. However, in moving from the take-off and climb position to the high lift position of the slat 20, this distance from the leading edge 22 to the center of rotation 151 of the track, this being the line shown at 158 decreases in going to the location of the high lift position of FIG. 2. This is the overall arrangement which necessitated the use of the auxiliary track assembly 30 of the prior art slat/fixed wing combination described with reference to FIGS. 1 through 4.

To discuss another facet of the present invention, (the significance of this analysis will become more evident later herein when the method of design in the present invention is discussed.) reference is now made to FIG. 8. In FIG. 8, there is shown the surface contour of the concealed surface portion 132 of the fixed wing 102 of the present invention in broken lines, and in solid lines the concealed surface contour 132a that is typical of the prior art configurations of the system described with reference to FIGS. 1 through 4. It can be seen that the furthest leading edge location 160 has been moved forwardly from the corresponding location 160a of the prior art. Further, the forward concealed nose surface portion 134 has been moved upwardly and forwardly from the corresponding surface portion 134a of the prior art. Also, the second transition line 142 has been moved upwardly from the corresponding location 142a of the prior art contour. However, the surface contour 136 extends rearwardly to the corresponding location of the prior art contour so that these coincide as they extend toward the rear transition line 138 and on to the upper surface contour 140. (More specifically the forward part of the concealed surface portion 136 is spaced upwardly from the surface portion 136a of the prior art, but becomes coincident with the prior art surface at the surface area indicated at 136c.

To explain the significance of this change in contour in the context of the overall slat and wing configuration, reference is made to FIGS. 9A through 9D. FIGS. 9A and 9B show the aerodynamic contours of the typical prior art slat/fixed wing combination of the prior art in solid lines, the combination of the present invention in broken lines, and an alternative configuration shown in dotted lines, with all of these being in the high lift position. FIG. 9C shows the pressure distribution over the aerodynamic contours of the fixed wings. FIG. 9D illustrates the pressure distribution over the slats. The configurations of each of the three slats shown in FIG. 9B are essentially the same, and they differ in that they are positioned at different locations relative to the contour of their associated fixed wings.

The fixed wing contour of the concealed surface portion 132a of the prior art shown in FIG. 9A follows more or less an expected aerodynamic contour where the pressure curve 162 in FIG. 9C reaches a peak at 164 and then declines as the airflow continues rearwardly, as at 166. On the other hand, the pressure curve resulting from the optimized contour 132 of the concealed surface portion of the present invention, as indicated by the broken line 170 of the graph of FIG. 9C is rather different. The pressure over this contour 168 reaches an early peak at 172, declines sharply toward a mid-location at 174, and then reaches a second peak at 176 which is at the back end of the concealed surface portion of the fixed wing. From there, it drops along a pressure line 178 which is generally similar to the prior art pressure contour 162. For purposes of comparison, a less optimized contour is shown at 180 in FIG. 9A. This contour reaches an early relatively sharp peak at 182 in FIG. 9C, and then drops more or less continuously as indicated at the curve portion 184 and continuing on toward the right.

The pressure distributions over the surfaces of the three slats of FIG. 9B are, as can be seen in FIGS. 9D, pretty much the same. The lateral shifting of the pressure curves in FIG. 9D is due primarily to the different positioning of each of the slats.

Figure 10:
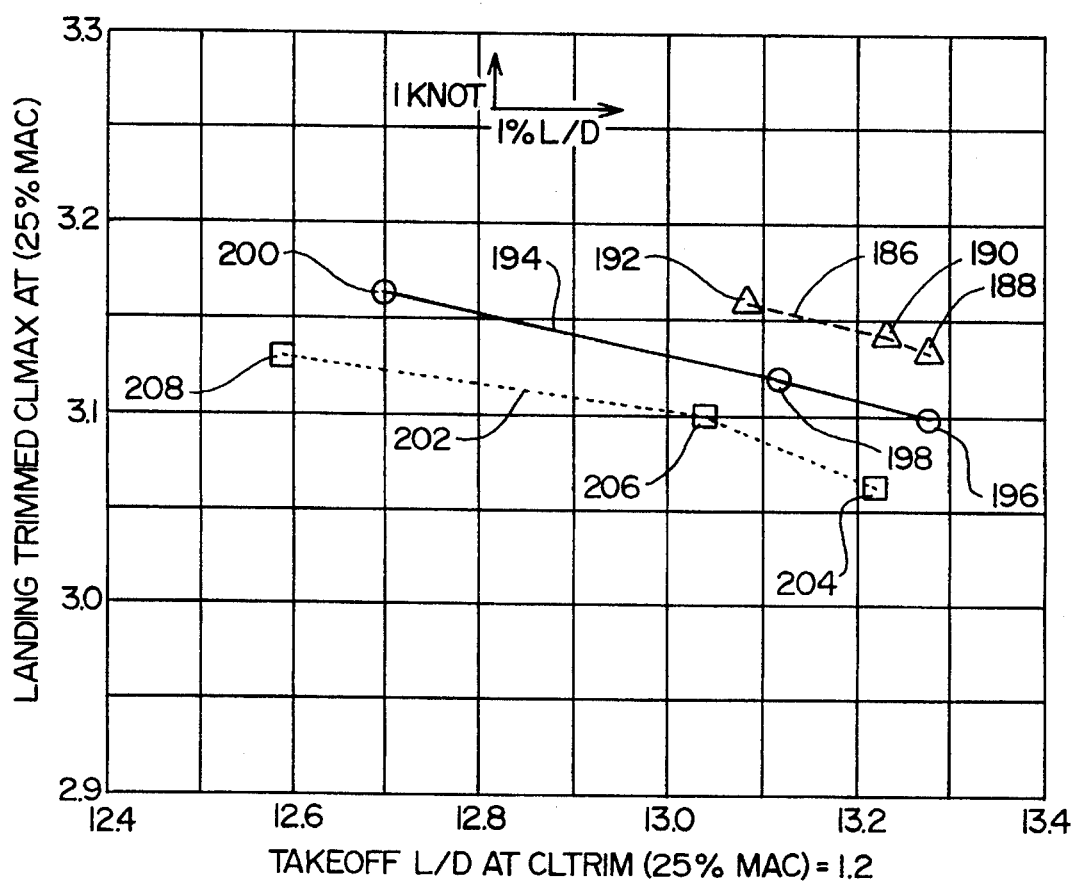
FIG. 10 is a graph illustrating the performance of the three different configurations shown in FIGS. 9A and 9B, where lift coefficient is represented along the vertical axis, and takeoff lift over drag is represented along the horizontal axis.

Next, reference is made to FIG. 10 which illustrates the performance of the three slat/wing arrangements of FIGS. 9A/9B. The horizontal axis denotes the lift over drag ratio of the slat/wing arrangement in its takeoff configuration. The vertical axis denotes the maximum lift coefficient in the landing position where the slat is fully deployed in the landing configuration. The reason for this arrangement in the graph of FIG. 10 is that the lift over drag ratio is generally more critical during takeoff, while the maximum lift coefficient is generally a more critical consideration for the landing configuration.

In the preferred configuration, each of the slats is positioned, relative to its associated fixed wing, so that in the take-off configuration the trailing edge of the slat leaves no gap so that it is positioned directly against the adjacent fixed wing surface. One set of lift over drag values for takeoff and also the maximum lift coefficient values for each of the fixed wing/slat configurations of FIG. 9B are shown at the right hand markings of the graph of FIG. 10, these being for the configuration where there is no slat gap at take-off. For purposes of analysis, to get another set of values, the positioning of each of the three slat/fixed wing arrangements of FIGS. 9A/9B were changed to swing the arc defining the path of movement upward slightly so that a relatively small gap was formed in the take-off position. Then to get yet another set of values the arcuate path traveled by the slats in each of the arrangements of FIGS. 9A/9B were moved slightly further up so that a somewhat larger gap was formed at the intermediate take-off position.

The values (i.e. data points) for the preferred configuration of the present invention are indicated by triangles in FIG. 10 and the triangles are interconnected by the broken line 186 (corresponding to the broken line configuration shown in FIGS. 9A/9B). The data points for the prior art configuration shown in solid lines in FIGS. 9A/9B are connected by a corresponding solid line 194 in the graph of FIG. 10, and the three data points are indicated each by a circle. The data points showing the performance of the configuration at 180 in FIGS. 9A/9B are shown by a corresponding dotted line in the graph of FIG. 10, with the data points being each indicated by a square. It can be seen from the graph of FIG. 10 that the overall performance of the present invention is superior to the overall performance of the other two configurations.

Let us first turn our attention to the line 186 which interconnects the three data points 188, 190, 192 of the present invention. The data point 188 indicates along the horizontal axis the lift over drag ratio in the takeoff configuration, and indicates along the left hand vertical axis the maximum lift coefficient in the landing configuration. The data point at 188 gives the values in the arrangement where in the takeoff configuration there is no gap formed between the slat and the fixed wing structure. The next data point 190 for the present invention is for an arrangement where the arcuate path of travel of the slat is swung upwardly slightly so that when the flap moves from the stowed position to the takeoff position, a relatively small gap is formed in the takeoff configuration. By so swinging the arc upwardly, the flap at the landing configuration would be raised somewhat from the position shown in FIG. 7. It can be seen that there was a slight decrease in lift over drag ratio at takeoff, but a slight increase of maximum lift coefficient when the flap was moved to the landing configuration.

Then the values for the third modification for the path of the flap in the present invention is shown at the data point 192 where-the arcuate path of travel of the flap is moved yet further up so that a somewhat larger gap is formed in the takeoff configuration. It can be seen that there is a further decrease in lift over drag ratio at takeoff position, but also a moderate increase in maximum lift coefficient in the landing position or configuration. Since this data as represented in the graph of FIG. 10 was taken, further refinements in the design of the present invention have actually raised the data point 188 upwardly so that with the flap arrangement where there is an unslotted takeoff position of the flap, the maximum lift coefficient for landing is almost as high as that achieved at the data point 192.

The connecting line for the prior art configuration shown in full lines in FIGS. 9A/9B is indicated at 194, and its three data points are indicated at 196, 198 and 200. The data point at 196 indicates performance where the movement of the slat is such that no gap is formed at takeoff. In this arrangement, it can be seen that the lift over drag ratio for takeoff configuration (at point 196) is substantially the same as that of the present invention (indicated at 188). However, the maximum lift coefficient on landing is less. Performance in the arrangement where there is a relatively small gap is shown at 198 and for a yet larger gap is shown at 200. It can be seen that while there was an improvement in maximum lift coefficient at landing, there was a substantially penalty in lift over drag ratio at take-off.

The third graph line or connecting line 202 indicates performance of the less preferred configuration indicated in dotted lines at 180 in FIGS. 9A/9B. The three data points are given at 204, 206 and 208, and these indicate, respectively, first the no slotted take-off configuration, second the take-off configuration with a smaller slot, and finally the take-off configuration with the larger slot. It can be seen that performance was worse than for the corresponding positions of the prior art configuration (graph line 194) and the present invention (graph line 186).

It is surmised that the contouring of the optimized configuration of the present invention, illustrated at 132 in FIG.

8 and 9A, in producing the double peak pressure (the peaks being shown at 172 and 176) provides some benefit in the present invention in that it allows the landing slat height to optimize at a higher height than is optimum with a single peak design. This higher height is a direct benefit in the present invention in that it accomplishes zero penalty for the present invention, while providing other benefits in simplification and eliminating gaps or openings in the fixed leading edge to accommodate the auxiliary positioning tracks. While all of the aerodynamic facets of the subject matter discussed in FIGS. 9A through 9D are likely not totally understood, it can be surmised that possibly the poorer performance of the contour 180 (shown in dotted lines in FIG. 9A) is due to the peak at 182 forming too sharply. It is surmised that the larger radius of curvature at the leading edge of the contour at 132 of the present invention contributes substantially to the improved results.

The double peak pressure distribution on the surface of the fixed wing is optimized for swept wings of commercial aircraft at flight Reynolds numbers where the leading edge flow is completely turbulent. The double peak minimizes the tendencies for the pressures to spike up at high wing angles of attack, which is detrimental in terms of stall progression. The initial front peak at 172 allows a reduced pressure recovery over the secondary peak region 176 which is favorable toward the turbulent flow field. The front peak 172 raises the trailing edge pressure on the slat and allows it to operate at a reduced slat height without penalty.

To describe the benefits of the present invention further, the pressure distribution on the fixed surface contour 132 is designed to produce a more optimized pressure distribution for a single pivot slat operating in the landing configuration of FIG. 7. The flow field on the leading edge of the fixed wing for flight Reynolds numbers results in a turbulent attachment line on the leading edge. The turbulent boundary layer benefits from a pressure distribution which is front loaded to minimize boundary layer growth on the upper surface. The front peak is rounded so that a leading edge spike does not form at higher angles of attack. This produces a more gentle stall characteristic. The secondary peak is a result of faring into the slat lower surface contour and is constrained by the structural minimums for the slat trailing edge. The maximum height of the first pressure peak is configuration dependent so that the stall progression does not jump to the first peak prior to reaching the maximum angle of attack.

An added feature of the front loaded concept, as described above, is a reduced tendency for a leading edge spike to form relative to a triangular pressure distribution. This allows margin for potential thinning of the wing or positioning of the fixed surface of the fixed wing at a more forward location which adds Fowler motion and improves the maximum lift on the system.

It will also be noted that in the contouring of the present invention, while the slat trailing edge 116 is in contact with the transition location 138 on the fixed wing upper surface, this trailing edge 116 separates from the fixed wing upper surface as it travels over the rear concealed surface portion 136, and then comes back into contact at the second transition line 142. Then the trailing edge 116 very quickly goes out of contact with the fixed wing surface as it moves to the high lift landing position of FIG. 7. This minimizes rubbing between the slat trailing edge 116 and the fixed wing upper surface. Further, the slat height at the high lift landing position of FIG. 7 is high enough to produce a landing position which is at an aerodynamic optimum. Also, the bulge increases the leading edge radius of the fixed wing, so as to produce the desired pressure characteristics as discussed above with reference to FIG. 9C.

To turn our attention now to the method of designing the leading edge slat/wing combination of the present invention, reference is now made to FIGS. 11 through 17.

Figure 11:
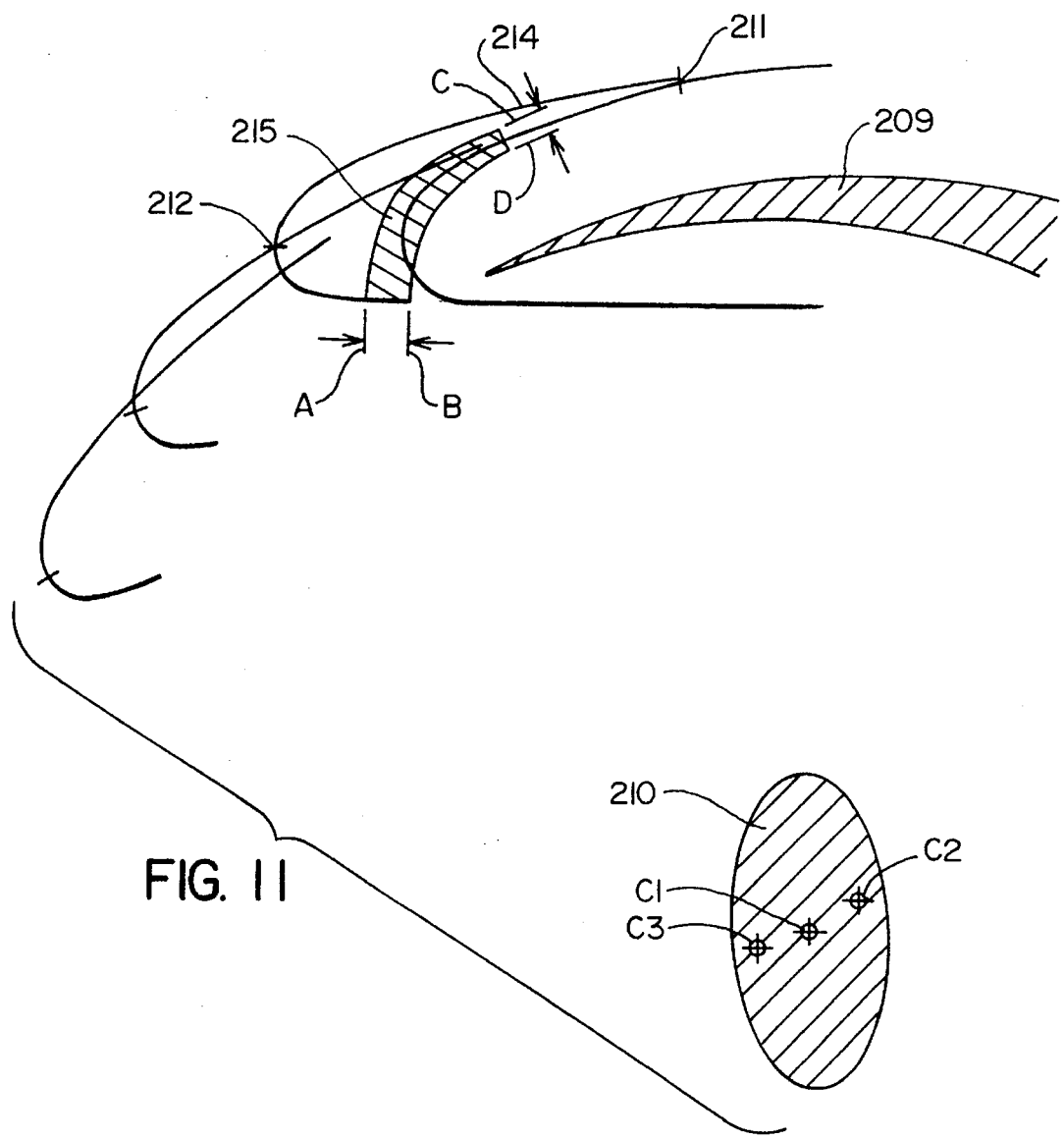

In FIG. 11, there is shown somewhat schematically an outline of the nose portion and upper aerodynamic surface of the leading edge slat, and the outer surface contour of the forward part of the fixed wing. The overall configuration shown in FIG. 11 (and also in FIGS. 12 through 16) approximates a configuration suitable for use in the present invention.

In accordance with common practice in the prior art, the type of representation shown in FIG. 11 has often been the overall design outline which is given by the product development or preliminary design group to the "project" to implement this configuration into actual hardware. Initially, the overall wing configuration (made up of the fixed wing plus the leading and trailing edge devices in their stowed position) is determined. This cruise configuration is the starting point or base line from which other design features are determined.

The next step is to take this basic wing configuration and carve it up into leading and trailing edge devices which are to be deployed for the takeoff and climb configuration, and also for the landing configuration. Of course, this must be accomplished in a manner that when these leading and trailing edge devices are stowed, the outside aerodynamic contour coincides with the basic overall cruise wing aerodynamic contour. Then the leading and trailing edge devices are positioned in their desired locations for optimized performance for the take-off position and for the landing position.

At this point, our analysis of the method of design of the present invention begins. First, there is a review of the various mechanical devices which are considered to be practical and desirable alternatives in deploying leading edge slats. Such a review would disclose that the use of an arcuately curved carrier track, such as shown at 34 in the prior art configuration of FIG. 2 and FIG. 4, has desirable features and should be considered. Further analysis will reveal the desired range of Fowler motion (i.e. the linear length of travel from the stowed position to the fully deployed landing position), and also the change in angular orientation of the leading edge slat from the stowed configuration to where it is slanted downwardly and forwardly in the fully deployed landing position. This will dictate to a large extent the overall length and the degree of curvature of the carrier track 122. Also, since the carrier track 122 functions as a beam carrying the aerodynamic loads on the slat it must have at least a certain minimum vertical thickness dimension. Beyond this, there must be support mechanisms for the carrier track, such as the rollers 126 and 128 of the present invention, and also a drive means such as the pinion gear 130. From this design data, we arrive at a slat actuating envelope which must fit within the envelope defined by the outer surface contours of the fixed wing.

It would be desirable that the forward end portion of the carrier track 122 be as low as possible in the envelope of the wing. One reason for this is that this would permit the middle upwardly curving portion of the carrier track 122 to better fit within the actuating envelope. Also, the Opening formed through the nose portion 110 of the fixed wing would be at a lower location where it would cause less disturbance in the airflow passing through slat gap at landing. As an approximation, a "design envelope" 209 is indicated in FIG.

11. This envelope defines the range within which the centerline 124 of the carrier track 122 could be located with the flap actuating mechanism 208 still fitting with the envelope of the outer aerodynamic contour of the fixed wing. This envelope 209 is drawn somewhat schematically, and the actual thickness dimension and configuration is not intended to be shown as a precise representation. However, for purposes of the present analysis, this representation shown at 209 In FIG. 11 will be adequate.

Now let us analyze where the center of curvature would be for circular arcs drawn within the envelope 209. The point C1 represents the center of the curvature for an arc drawn through the center of the zone 209. The point C2 represents an arc drawn along the top edge of the zone shown at 209, and the point C3 represents the center of curvature for an arc at the lower boundary of the zone 209. It immediately becomes evident that the forward to rear dimension within which the center of curvature can be moved is relatively small.

Also, it can be recognized that by increasing or decreasing the degree of curvature, these center points C1, C2 and C3 can be raised or lowered, depending upon the tolerance of the angular positioning of the leading edge slat in its fully deployed landing position, compared to its angular position in the stowed location. From this, we arrive at a zone 210 which would define the possible centers of curvature for various arcuate configurations of the centerline of the carrier track 122. Again, this zone 210 is represented in FIG. 11 simply for purposes of illustration, and is not intended to be an accurate representation of the size or shape of the zone which would be practical for a given airplane design. Of course, it is also understood that the size and configuration of this zone 210 would vary depending upon the overall design parameters of the airplane.

Now we turn our attention to the design limitations imposed upon the leading edge slat/wing combination. The point 211 in FIG. 11 represents the location of the trailing edge of the slat in the stowed cruise configuration, and the vertical location of this point 211 is substantially fixed by the overall wing configuration. Also, the farthest rearward location of the point 211 is determined in large part by the location of the front spar. Since the front spar is a load carrying member subjected to substantial force, it is desirable that its height dimension be as great as possible, and if the trailing edge of the slat were moved over the front spar, this would necessitate the vertical dimension of the spar being diminished. The point 211 could be moved further forward, but this would reduce the overall length of the slat and thus decrease the possible Fowler motion.

The nose location 212 of the slat is substantially fixed by the overall configuration of the wing in cruise configuration, as is the upper aerodynamic slat surface 214. However, there is some design tolerance for the positioning and configuration of the nose surface portion 215 of the fixed wing, this surface portion extending from the furthest forward surface location of the fixed wing upwardly a short distance over the concealed surface portion of the wing. The tolerance zone is identified by the letters A,B,C, and D, and this tolerance zone is shaded in FIG. 11.

The forward location at "A" is largely limited by structural design considerations for the nose portion of the slat. In other words, if this limit line at "A" is pushed too far forwardly, there is not enough room within the slat nose portion to provide proper structural support and other requirements for this area (e.g. deicing, etc.). Also, the radius of the aerodynamic contour can be a limiting factor.

The rear limit in the design tolerance zone, indicated at "B" is determined by aerodynamic considerations, and also by the location of this surface relative to the slat trailing edge in the fully deployed landing position. Also, there are design considerations relative to the slat actuating mechanism. The wings for subsonic commercial transports are commonly tapered in an outboard direction, but for cost reasons it is sometimes desirable to make the inboard and outboard slat deployment mechanisms identical. This would mean that relative to the overall sizing of the aerodynamic contours at the outboard end, there would possibly be a greater gap for a given amount of Fowler motion. If there is a certain amount of tolerance in this aerodynamic gap or slot in the high lift configuration, then a savings can be realized by using duplicate slat deployment mechanisms at the outboard and inboard portions of the slat.

The design tolerance limit at "C" is determined at least in part by the minimum slat wedge thickness that is required. Also, it is limited aerodynamically relative to the pressure peak on the upper fixed wing surface.

The lower limit "D" of the surface contour 215 is determined by a number of factors, one of these being the sizing of the slat gap in the landing configuration relative to stall handling characteristics. In other words, the size of the gap may be tailored so that the stall will occur at a desired location at a certain angle of attack and speed in the landing configuration. Another factor is that the contour of the concealed surface portion of the fixed wing must be aerodynamically aligned with the rest of the upper fixed wing surface.

At this time, it should be noted that one of the important features of the preferred embodiment of the present invention is that the configuration of the nose and forward upper surface portion of the fixed wing is modified from the prior art configuration in a manner to help achieve the design goals of this first embodiment. This was described previously in this text relative to FIG. 8, and will be described further later herein with reference to FIGS. 18–20.

Reference is now made to FIG. 12, which shows the slat in the high lift takeoff position, with the trailing edge of the slat indicated at 216. The design tolerance zone for the location of this line 216 is indicated in the shaded area of FIG. 12. The forward location "E" is limited by the need to prevent inflection in the slat's surface junction with the aerodynamic surface of the fixed wing. In other words, the upper aerodynamic surface portion 214 of the slat should be aligned as closely as possible with the fixed wing upper surface portion immediately behind.

The rear limit "F" is limited in that it is desired to get adequate Fowler motion for the takeoff configuration, and therefore, this location "F" should be as far forward as possible, without compromising other design considerations. The height limits of the zone of the point 216 of FIG. 12 are indicated by the letters "G" and "H". This tolerance dimension is dependant upon at least two things. First, as indicated with reference to FIG. 11, it is possible to change the surface contour of the fixed wing, as indicated in the limits "C" and "D" in FIG. 11, and this would of course vary the position of the point 16 if the trailing edge 216 is in contact with the fixed wing upper surface. Also, the design tolerance limit of point 216 could be moved upwardly if a gap is to be formed in the intermediate takeoff and climb position of the slat.

Also, we note in FIG. 12 that there is a design tolerance zone in the angular positioning of the slat forward nose point 218, this tolerance zone being indicated at "J". Obviously, the movement of the nose location 218 along a line parallel to the cord axis of the slat cannot be made without having a corresponding movement in the trailing edge location 216. Accordingly, the forward to rear position limits at the point 218 are limited by the tolerance area defined by the letters "E" and "F" in FIG. 12.

FIG. 13 illustrates the flap in its high lift landing configuration. It will be seen that in addition to showing the tolerance design zone defined by letters "A" through "D", there is also shown a design tolerance zone for the trailing edge location 220, this zone being defined by the letters "L", "K", "M" and "N". The forward rear tolerance location is defined by the letters "L" and "K", and these in large part determine the slot width. Normally the width of the slot at high lift would be between one percent to four percent of the cord length of the total wing the cruise configuration. The tolerance zone for the Point location 220 is also determined by the configuration of the nose surface of the fixed wing. In other words, if the configuration of the fixed wing is moved to its furthest rear limits indicated at "B" and "D", then this tolerance zone for the point 220 would be moved rearwardly, and vice versa.

The limits of the height for the trailing edge location 220 is indicated by the letters "M" and "N". Normally this height tolerance would be no greater than two percent of the cord length of the wing. If this location 220 is at too low of a position, then the flow through the slot and over the more tightly curved nose portion of the fixed wing would be more exposed to the main air stream, and this would not be desirable. Also, there is an angular tolerance of the forward slat nose location 222 in the high lift position, indicated at "p" so that some deviation in the angular position of the slat could be tolerated, relative to the trailing edge location 220.

To review briefly the analysis which has preceded thus far with regard to FIGS. 11 through 13, various design tolerance zones have been identified. The next step is to position the slat so as to comply with these tolerance zones and also to be compatible with the tolerance zones 209 and 210 of the slat deployment mechanism 108. This will be discussed with reference to FIGS. 14 and 15.

With reference to FIG. 14, we first select the three desired locations of the slat trailing edge, as indicated at 211, 216, and 220. These three points define a circular arc, and in order to incorporate the teachings of the present invention, the arc defined by the points 211, 216 and 220 must be so located and have a degree of curvature so that the center of curvature C4 of this arc coincides with the center of curvature of the carrier track within the zone 210 of the slat deployment mechanism, as shown in FIG. 11. This center of curvature C4 is determined quite simply by first drawing a straight line between the points 211 and 216 and then drawing the perpendicular bisector which is shown at 224. Then, a line is drawn between points 216 and 220, and the perpendicular bisector of that line is drawn (this being shown at 226). The intersection of the lines 224 and 226 define the center of curvature C4. Then the location of the points 216 and 220 within their respective design tolerance zones are adjusted so that the arc which they define has a center of curvature coinciding with the center of curvature C1 within the limits of the zone 209. The manner in which this could be done is explained further below with reference to FIGS. 15 and 16.

Figure 15:
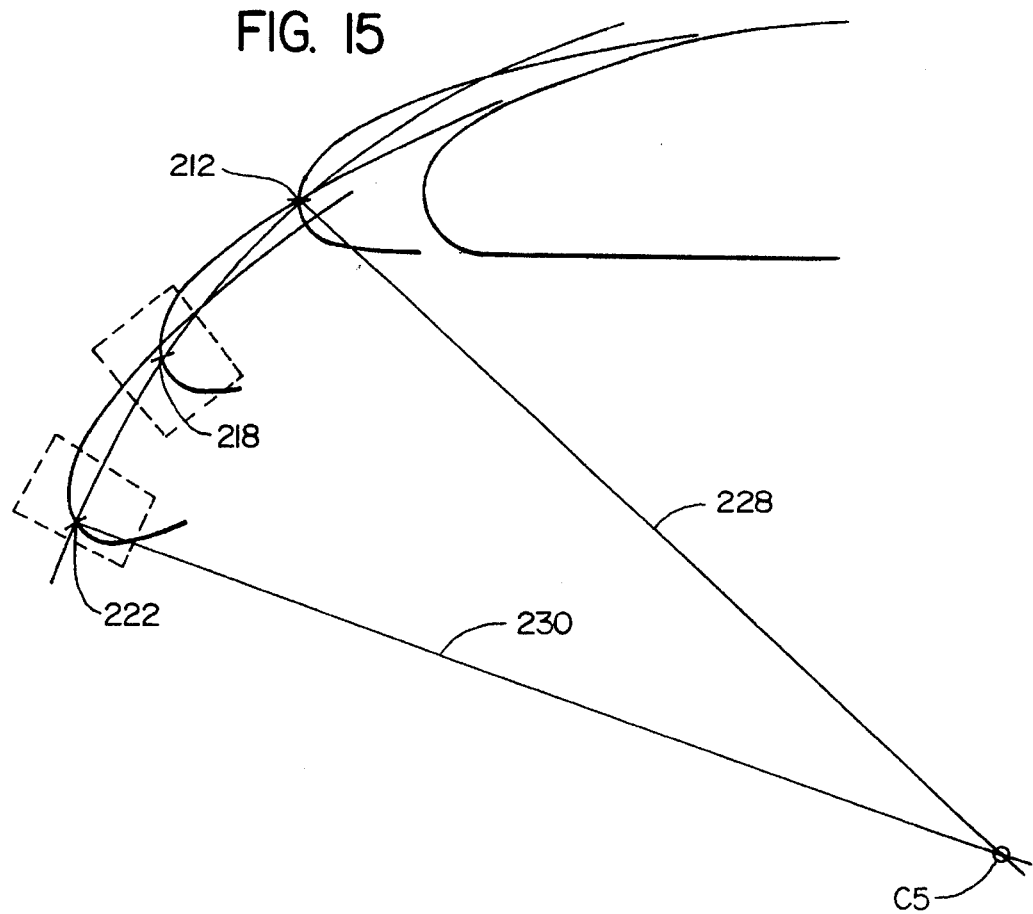

With reference to FIG. 15, let us analyze this same procedure relative to the desired leading edge locations 212, 218 and 222. First, three locations of the slat arc selected in accordance with the tolerance zones, such as shown in FIGS. 11, 12 and 13. By employing the same techniques shown in FIG. 14, a center of curvature C5 of the arc defined by the points 212, 218 and 222 is determined. The lines 228 and 230 are simply the two radius lines which are drawn from the center point C5 to the nose locations at 212 and 222, respectively.

Figure 16:
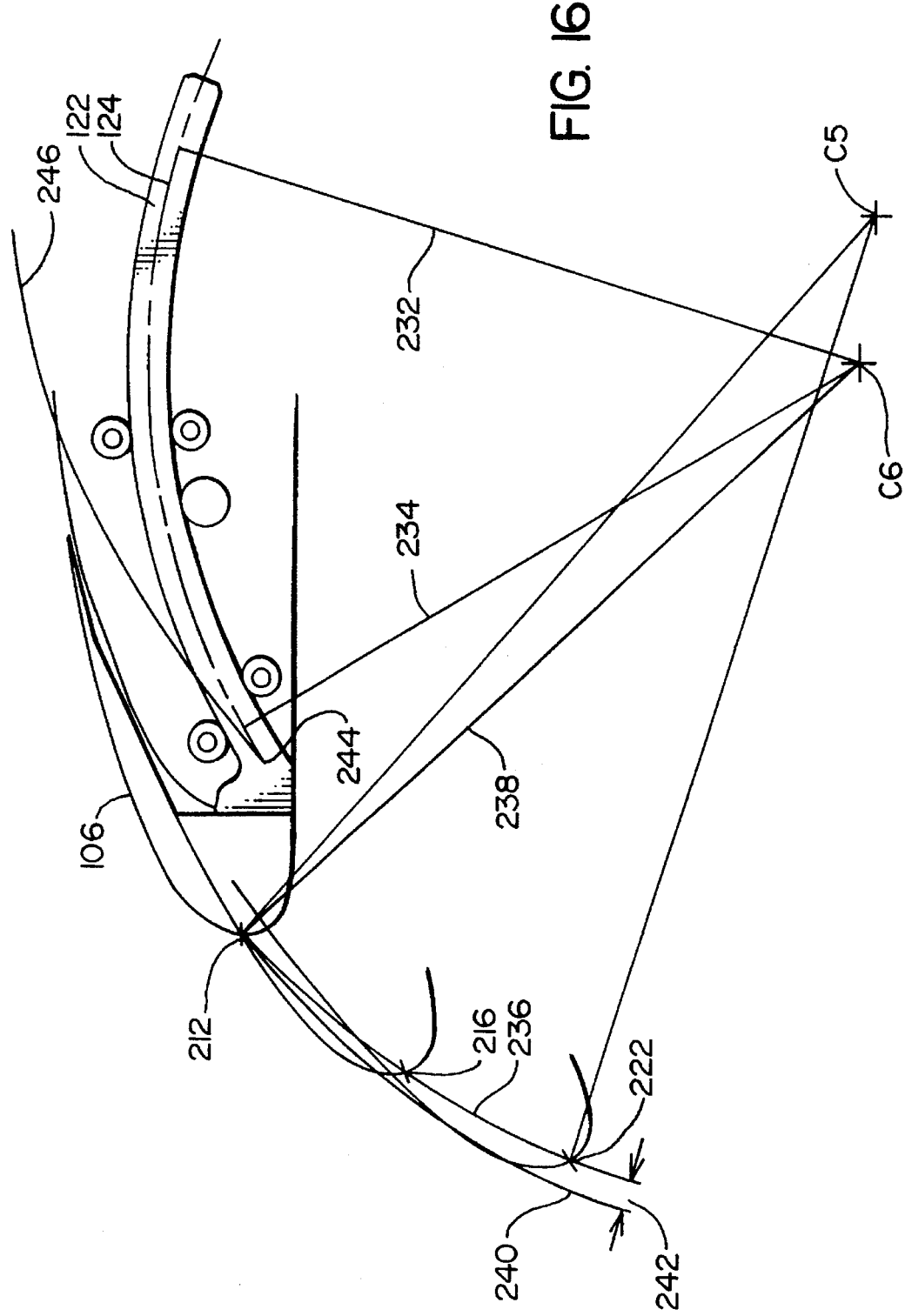

To continue this analysis, reference is now made to FIG. 16. It can be seen that in FIG. 16 the slat/wing combination as shown in FIG. 5 is duplicated. The center of curvature of the carrier track 122 is shown at C6. There are two radius lines 232 and 234 drawn from C6 to the arcuate center axis 124 of the carrier track 122. Also, the three selected positions of the slat 106 are illustrated in FIG. 16, as shown in FIG. 15. The center of rotation of the arc defined by the leading edge points 212, 218 and 222 is shown at C5 and the arc defined by these points 212, 218 and 222 is shown at 236. The centers C5 and C6 do not coincide, and it is evident that some design adjustments must be made.

For purposes of analysis, a radius line 238 is drawn from the center point C6 of the track 122 to the slat nose location at 212 in the stowed position. Then an arc 240 is drawn from the point 212 downwardly to a location adjacent to the slat leading edge location 222. It can be seen that the arc 240 extends outside the arc 236. The distance between the arcs 236 and 240 at the location of the point 222, is indicated an 242.

If the slat/wing combination is to be constructed as shown in FIG. 16, then it is necessary that the two centers of rotation C5 and C6 be coincident with one another. As in now stands in FIG. 16, this is not the case.

One possible means of solving this is to align the carrier track 122 so than its center of curvature is at C5. For purposes of analysis, this was done graphically in FIG. 16, and an arc (having C5 as its center), was drawn from a forward location 244 of the carrier track center line 124 rearwardly, and this arc is shown at 246. It can be seen that this arc 246 extends rearwardly and upwardly through the upper surface contour of the fixed wing. Obviously, this is not an adequate solution.

On the other hand, another possibility is to change the positioning of the slat 106 so that the nose locations at 218 and 222 are moved outwardly so that these lie on the arc 240. This automatically makes the center of curvature of the arc defined by points 212, 216 and 222 at point C6 so than it coincides with the center of curvature C6 of the carrier track 122. On the assumption that this keeps these point locations 218 and 222 within the tolerance zones "J" and "P" in FIGS. 12 and 13, respectively, this would satisfy the design requirements.

As indicated above, a similar analysis would have to be performed relative to the arc of rotation defined by the trailing edge points 211, 216 and 220, as shown in FIG. 14. The trailing edge locations at 216 and 220 would be adjusted within design tolerance zones "EFGH" and "LKMN" to make the center of curvature of the arc defined by the trailing edge points 211, 216 and 220 to coincide with the center of curvature C6 of the track.

Let us now review the design procedure. First the overall design of the forward fixed wing portion and the slat in its three positions would be established as in FIG. 11. Also, the design tolerance zones of FIG. 11 would be established. Next, the tolerance zones "EFGM" and "J" would be established in accordance with FIG. 12 and these placed on a transparency, which is positioned as an overlay on top of FIG. 11. Third, the zones "LKMN" and "J" of FIG. 13 would be established and placed on a transparency, and this would be made as a second overlay over FIGS. 12 and 11.

Then, an arcuate path of travel would be established for the trailing edge of the slat by beginning at point 211, using C1 as a center of rotation, and then passing an arc through the tolerance zone EFGH for the point 216 (see in FIG. 12) and also in the tolerance zone KLMN for the point 220, as shown in FIG. 13. If this could be accomplished, then there is no need to move from the center of rotation of C1. If this cannot be accomplished, then the center of rotation for the slat trailing edge could be adjusted somewhat within the zone 210 of FIG. 11 to find an arcuate path of travel beginning from the point 211 through the two design tolerance zones for the trailing end locations 216 and 220. If this cannot be accomplished, then the basic design and the tolerance zones for the design could be adjusted to provide for the coincident centers of rotation/curvature of the slat trailing edge and the slat track.

Then this same procedure is repeated relative to the slat leading edge locations 212, 218 and 220, as described above with regard to FIGS. 15 and 16. When we have arrived at three arcs (the arc of the carrier track center line 124 and the two arcuate paths of travel for the trailing edge 211 and the slat nose location 212), with these all having the same center of curvature, then we have arrived at a design where the slat can be fixedly secured to the forward end of the carrier track 122 and be moved solely by the movement of the carrier track 122 to the different operating positions. It is also to be understood, of course, that the manual process of physically drawing the various zones and then placing these on transparencies and physically making overlays could be accomplished by other analytical technique utilizing computer technology, etc. Obviously, the sequence of these analytical steps could be varied, and it might be necessary to go through two or more cycles to properly match the arcs to a single center of curvature.

Once the basic design is accomplished where the arc defined by the carrier track and the two arcs defined by the paths of travel of the slat nose and trailing edge are positioned within the appropriate design tolerance zones so as to have a common center of curvature, then the design can be fine tuned to move the locations within the design tolerance zones to optimized locations. For example, this has been done relative to the configuration of the first embodiment shown in FIGS. 5 through 7, and it was found that the values indicated at 188, 190 and 192 of the graph of FIG. 10 could even be improved further.

As a further refinement, the design tolerance zones could be established in gradients where there is an inner more preferred zone, an outer less preferred zone, and so forth. Further, in addition to defining the slat/carrier track design parameters to accomplish the proper positioning of the track and the proper construction and location of the slat actuating assemblies, this same technique can be used to accommodate other design considerations, which may be structural, or which could possibly deal with positioning of other components in this area of the airplane.

Figure 17:
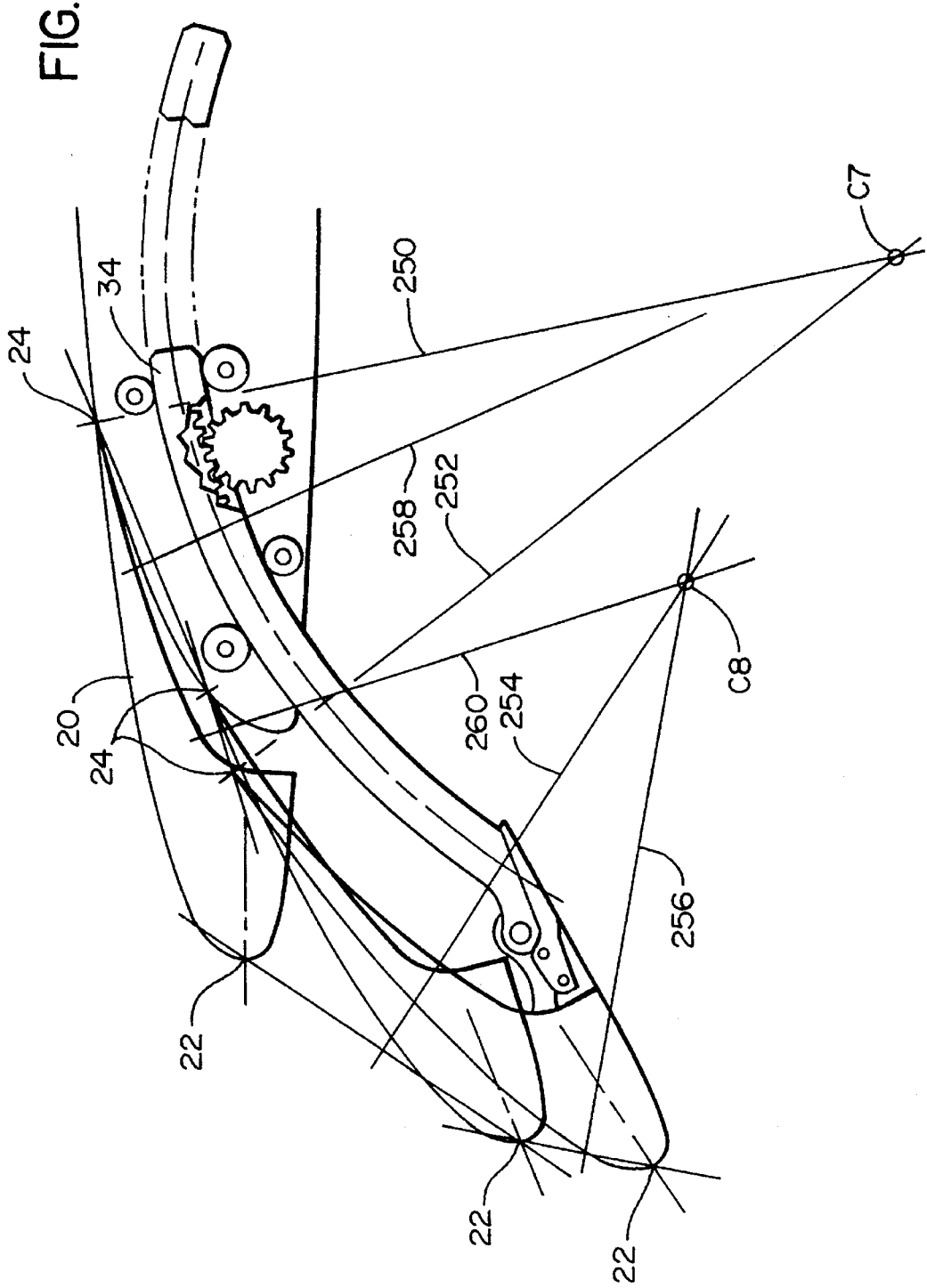

For purposes of comparison, reference is now made to FIG. 17 that shows the same prior art slat wing combination illustrated in FIG. 2. There is shown at C7 the center of curvature for the carrier track 32, and two radius lines 250 and 252 are shown. The nose location 22 of the flap 20 is shown at its three different positions (i.e. cruise, takeoff and landing), and the center of arc defined by the three locations of the slat nose point 22 was determined and by using the same method as described with reference to FIG. 14. The center of curvature was found to be located at C8.

Then the three locations of the trailing edge location 24 were identified (at cruise, takeoff and landing), and the center of curvature of this arc was attempted to be found. The two perpendicular bisectors at 258 and 260, and it be seen that the arc defined by the three locations of the point 24 actually has a center of curvature which would be located above the slat track assembly where the two perpendicular bisectors 258 and 260 would intersect.

Figure 19:
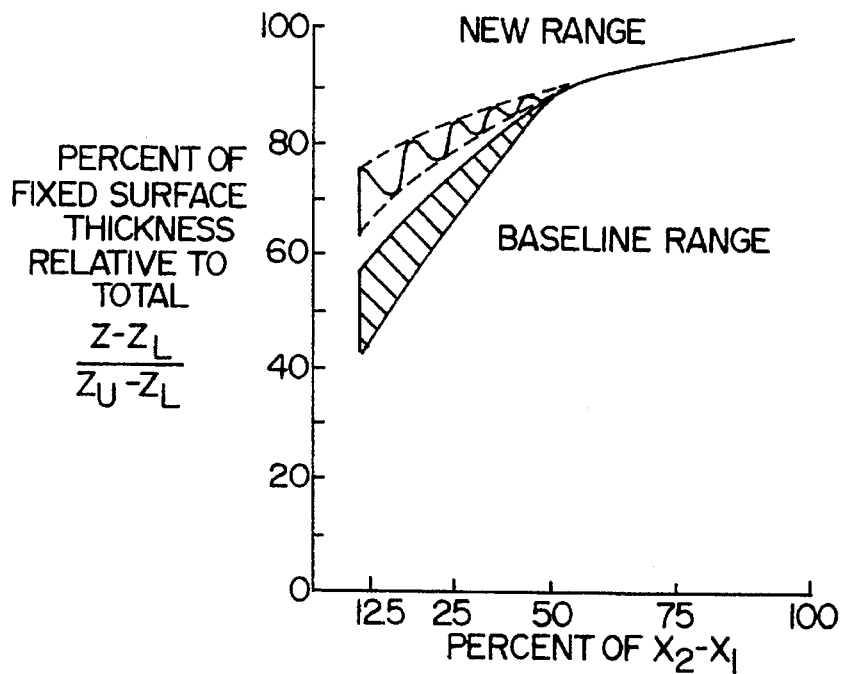
FIG. 19 is a graph illustrating the surface contours of the present invention in comparison with the prior art surface contours.
Figure 18:
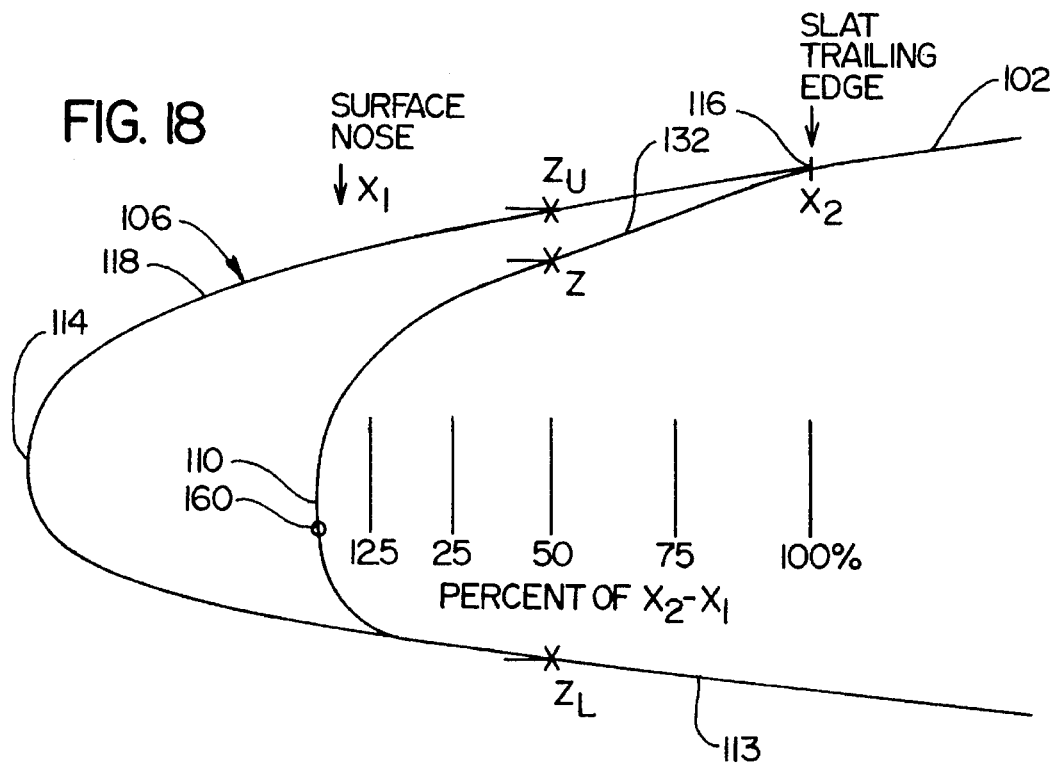
FIG. 18 is a sectional view similar to FIG. 8, showing surface contours of the fixed wing and slat in the cruise position, and illustrating certain locations along the forward fixed wing portion for purposes of analyzing the surface contours of the concealed nose and forward surface portion of the fixed wing.

To discuss further another facet of the present invention, reference is made back to FIG. 8, and also to FIGS. 18 and 19. It was indicated earlier herein that the fixed wing of the present invention in the area of the nose and the upper concealed surface portion was modified in the specific embodiment described herein from the prior art configuration of FIGS. 1–3 to better achieve the desired results of the present invention. Specifically, the nose surface portion 160 was moved further forward, relative to the prior art, and the concealed surface area 132 was moved upwardly and made more blunt. As was described with respect to FIGS. 9A through 9D and also FIG. 10, this enabled the design to be optimized so that there were no penalties, and yet the simplification of the present invention was accomplished.

To quantify this, reference is made to FIGS. 18 and 19. In FIG. 18, there is shown in outline a representation of the outer surface of the forward portion of the fixed wing 102 and of the slat 106. For purposes of illustration, as shown herein, the longitudinal dimension is somewhat shorter relative to the vertical dimension. Thus, it can be seen in comparing FIG. 18 with, for example, FIG. 5 or FIG. 8, the nose portion of the fixed wing 102 in FIG. 18 looks somewhat more blunt than what is illustrated in FIGS. 5 and 8.

To describe the layout of FIG. 18, first, a horizontal distance is determined from the farthest forward nose portion 160 at the leading edge 110 of the fixed wing 102 to the location of the trailing edge 116 of the slat 106 in the stowed configuration. Then percentage increments are given along the longitudinal axis of both FIGS. 18 and 19. It can be seen in both FIGS. 18 and 19 that these are given at 12.5%, 25%, 50%, 75% and 100%. Then at each of these longitudinal locations, there is determined two vertical thickness dimensions. First, there is the vertical thickness dimension of the fixed wing leading edge portion, this being measured from the lower surface 113 of he fixed wing (or from the lower of the combined slat/fixed wing if the slat has a lower surface portion extending rearwardly along the lower part of the fixed wing) to the upper surface 132 of the fixed wing. Then the vertical thickness of the combined wing at that location (the combined wing being the fixed wing plus the slat) is determined at each longitudinal location. Thus, for example, the vertical thickness of the combined wing at the 50% location is measured from the upper surface 118 of the slat 106 to the lower surface 113 of the fixed wing at that particular location. Then each vertical thickness dimension of the fixed wing alone at each longitudinal location is taken as a percentage of the total thickness of the combined slat/wing combination at each such location.

To illustrate the difference in the contour of the concealed surface portion 132 of the fixed wing 102 with that of the prior art configuration shown in FIGS. 1 through 3, the comparative values are presented in the graph of FIG. 19. The shaded area designated "new range" illustrates the preferred range of the vertical thickness dimension of the surface of the fixed wing as a percentage of total thickness at that same location. It can be seen that at the 12.5% longitudinal location, the preferred vertical thickness range is between approximately 62% or 63% to approximately 76%. At the 25% location, this vertical thickness dimension in the new range of the present invention is between about 77% to about 83% of the total vertical thickness at that location.

There is also shown in the graph of FIG. 19 a shaded area designated "baseline range", and this represents the corresponding values of the prior art configuration shown in FIGS. 1 through 3, and includes the contours present in the Booing 727, 737, 757 and 767 models. These values at the 12.5% location are between about 42% to 57%, and at the 25% location between about 63% to 73%. It can be seen that up to approximately the 50% longitudinal location, the thickness dimension of the fixed wing at any given location, relative to the vertical thickness of the total wing is less than the preferred range for the present invention.

Figure 20:
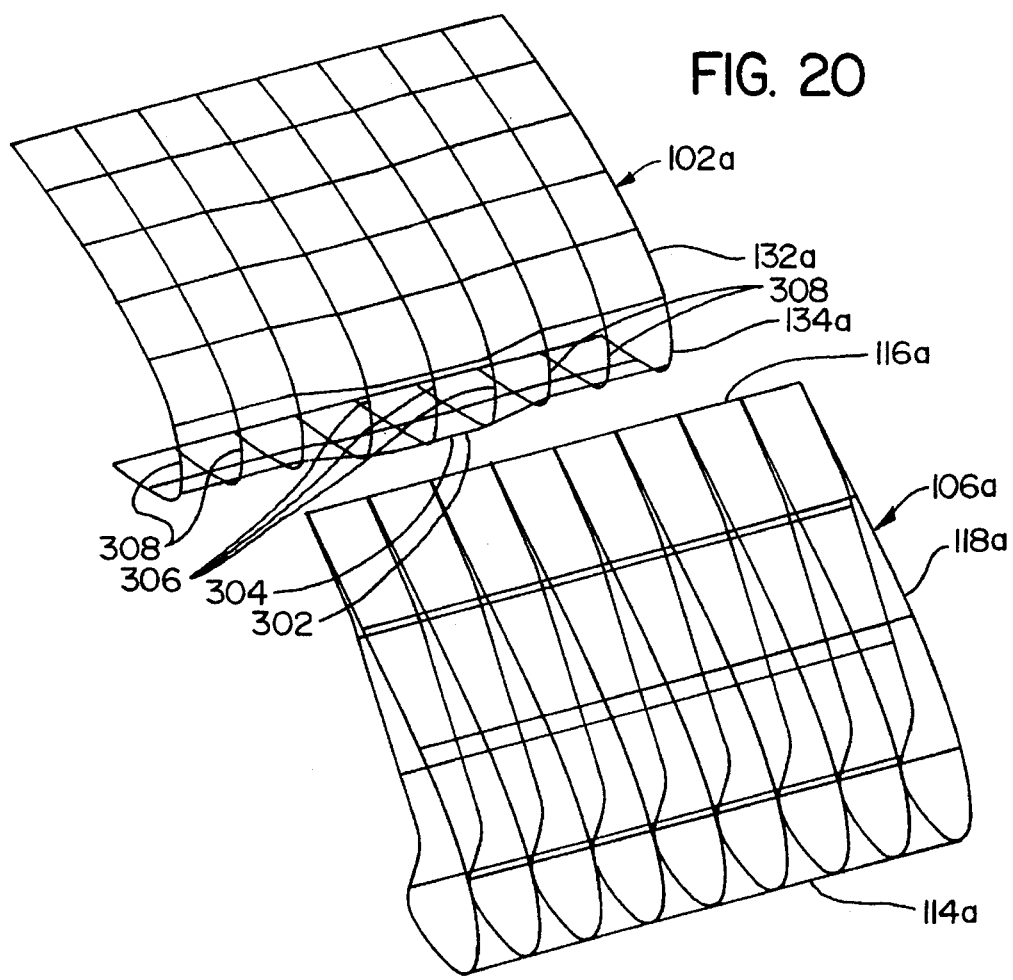
FIG. 20 is a isometric view of the surface contours of a second embodiment of the present invention, showing the slat in its high lift position.
Figure 21:
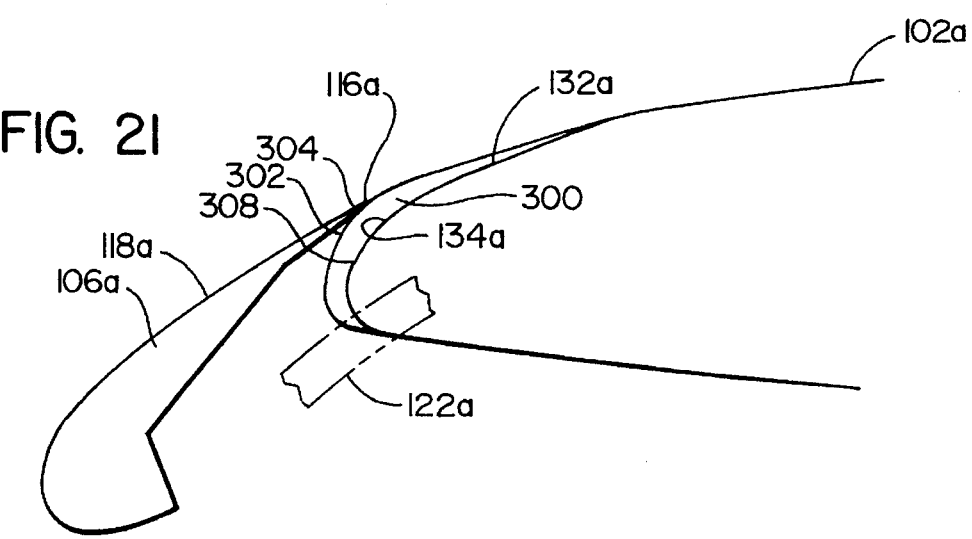
FIG. 21 is a sectional view, taken parallel to a cordwise axis, illustrating the contours of the second embodiment shown in FIG. 20, with the slat in the take-off/climb configuration.
Figure 22:
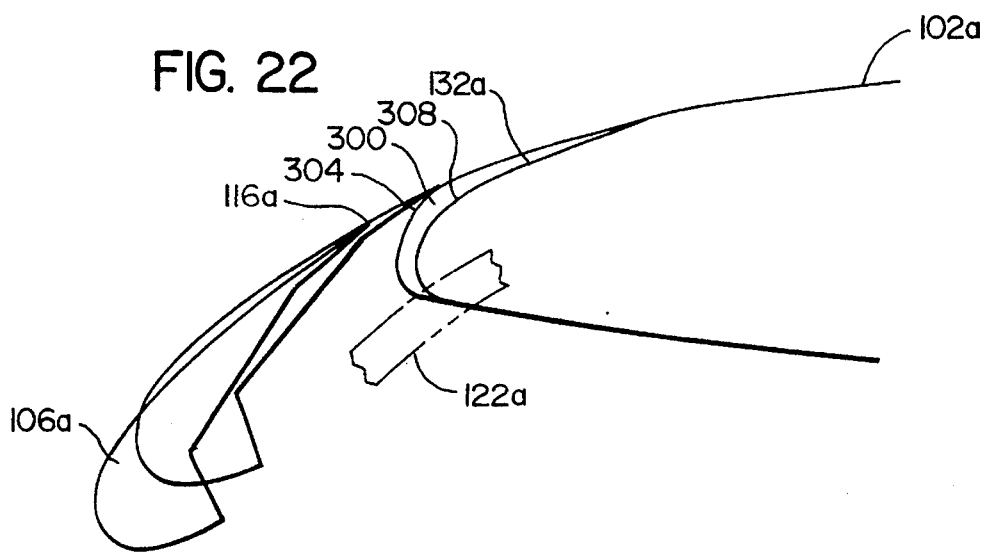
FIG. 22 is a view similar to FIG. 21, also showing the second embodiment, with the slat in both its take-off/climb position and in its high lift position.

A second embodiment of the present invention is shown in FIGS. 20 through 22. Components of this second embodiment which are similar to those of the first embodiment will be given like numerical designations, with an "a" suffix distinguishing those of the second embodiment.

In the first embodiment, as described when the slat 106 is in the intermediate take-off and climb position, the trailing edge 116 of the slat 106 is in contact with the concealed surface portion 132 of the fixed wing 102. However, there can be certain benefits in positioning the slat 106 so that it forms a gap during take-off and climb. For example, in the graph of FIG. 10, it can be seen that in the preferred configuration of the present invention, when the slat 106 is positioned so as to form a slot at the take-off and climb position, the lift coefficient can be improved. However, this was done at the sacrifice of a decrease in lift-over-drag ratio.

To turn our attention now to the second embodiment of the present invention, reference is now made to the isometric view of FIG. 20, which shows in outline the concealed surface portion 132a of the fixed wing 102a, and also shows an outline of the surface contour of a portion of the slat 106a in the high lift position. The outer surface portion of the slat 106a (i.e. the upper aerodynamic surface 118a and the surface area in the vicinity of the slat leading edge 114a) is the same as the slat outer surface contours of the slat 106 of the first embodiment.

However, in this second embodiment, the components are arranged so that the arcuate path of travel of the slat 106a is moved upwardly to form a gap 300 (see FIGS. 21 and 22). Also, the contour of the front edge nose concealed surface portion 134a is modified in the area of each carrier track 122a. This is done in a manner so that in the take-off and climb configuration, while the slot 300 is formed between the slat trailing edge 116a and the concealed surface portion 132a along most of the leading edge portions, the trailing edge 116a is sealed in the vicinity of the carrier track 122a. More specifically, with reference to FIGS. 21 and 22, it can be seen that the nose concealed surface area 134a is spaced from the trailing edge 116a to form the gap indicated at 300. However, with reference to FIG. 20, it can be seen that the fixed wing nose surface contour at 302 has a raised central portion 304 that makes contact with the slat trailing edge 116a. On each side of the center raised portion 304, the surface areas 306 are contoured to blend into the adjacent fixed wing/nose contour areas 308 that are not raised. The other surface portions around the raised surface portion 304 are also blended into the surrounding surface area for proper aerodynamic contouring. (For ease of illustration, only a portion of the carrier track 122a is shown in FIGS. 21 and 22.)

To describe the operation of this second embodiment, when the slat 106a is in the take-off and climb configuration, while the major surface portion 308 of the concealed nose surface portion 134a is spaced from the trailing edge 116a so as to form the gap 300, at the vicinity of the raised surface portion 304, contact is made by this surface portion 304 with the trailing edge 116a. Thus, flow of air toward the gap 300 in the area of the carrier track 122a is diverted laterally and aft so as to flow through the areas of the gap 300 which are positioned on opposite sides of the carrier track 122a and on the wing lower surface. This reduces the drag that otherwise would be created by the air flowing directly by the carrier track 122a if this central raised portion were not present.

In FIG. 22, the slat 106a is shown having been moved from the take-off and climb position to the fully deployed high lift position. It can be seen that the slat trailing edge 116a is spaced from both of the nose surface portions 304 and 308.

In this second embodiment, the fixed wing concealed surface portion 132 is still set up to achieve a front loaded pressure distribution. This produces a landing height which is in the optimum range, and this second embodiment alleviates the problem of drag due to the actuating mechanism when the slat 106a is in the take-off/climb position.

Figure 23:
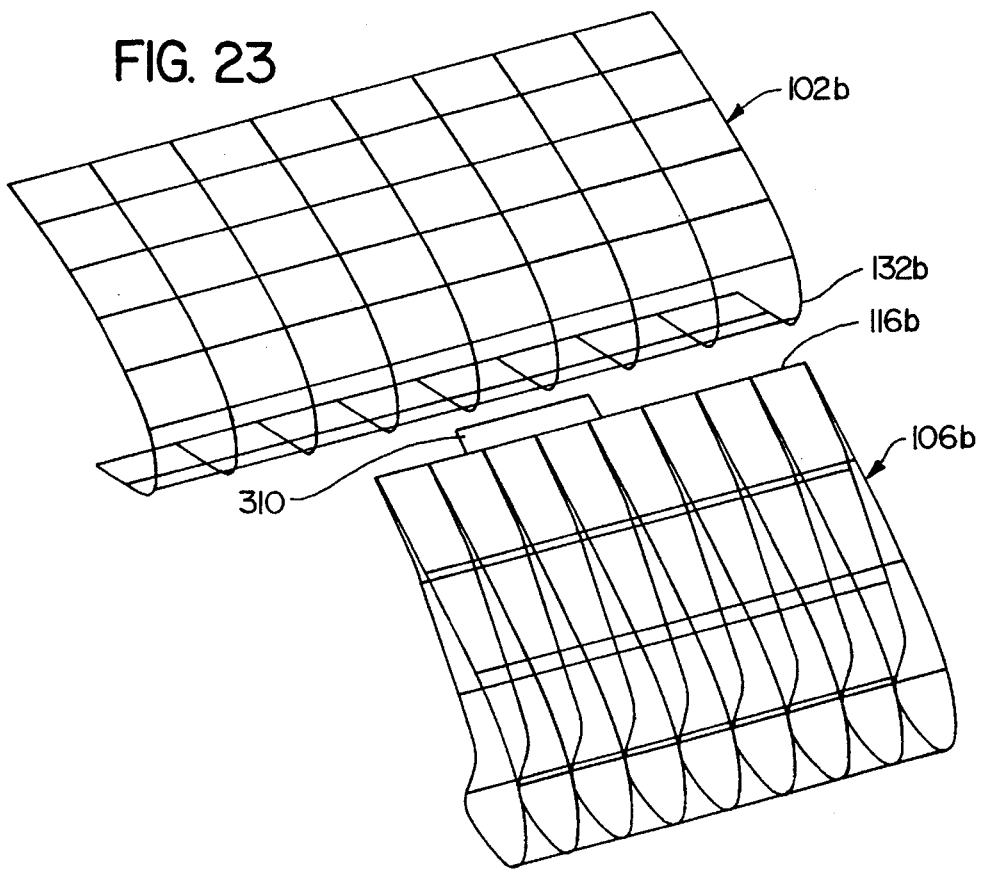
FIG. 23 is an isometric view similar to FIG. 20, but showing a third embodiment of the present invention.
Figure 24:
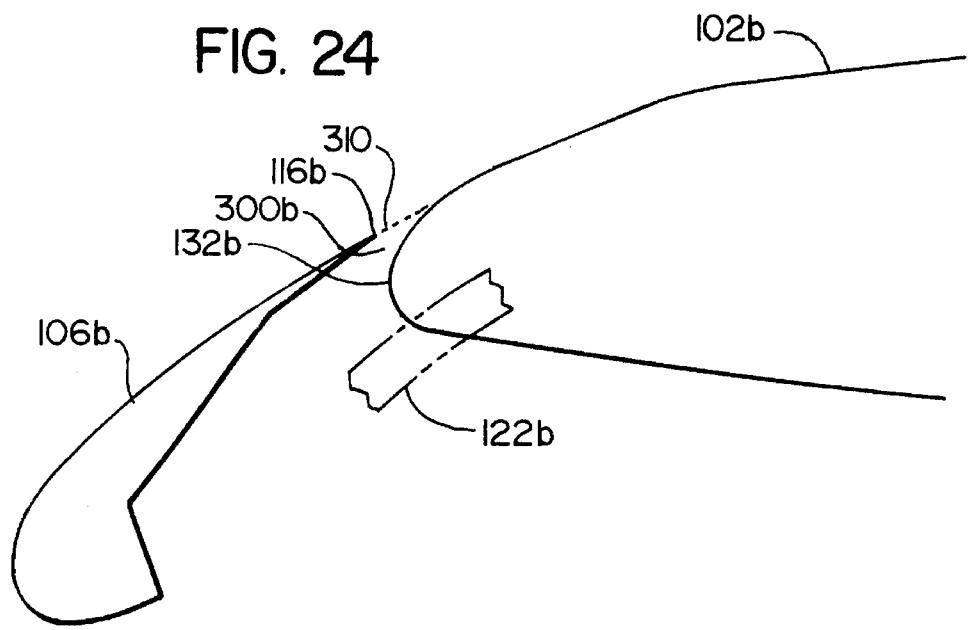
FIG. 24 is a sectional view similar FIG. 21, showing the third embodiment of the present invention with the slat in the intermediate take-off/climb configuration.
Figure 25:
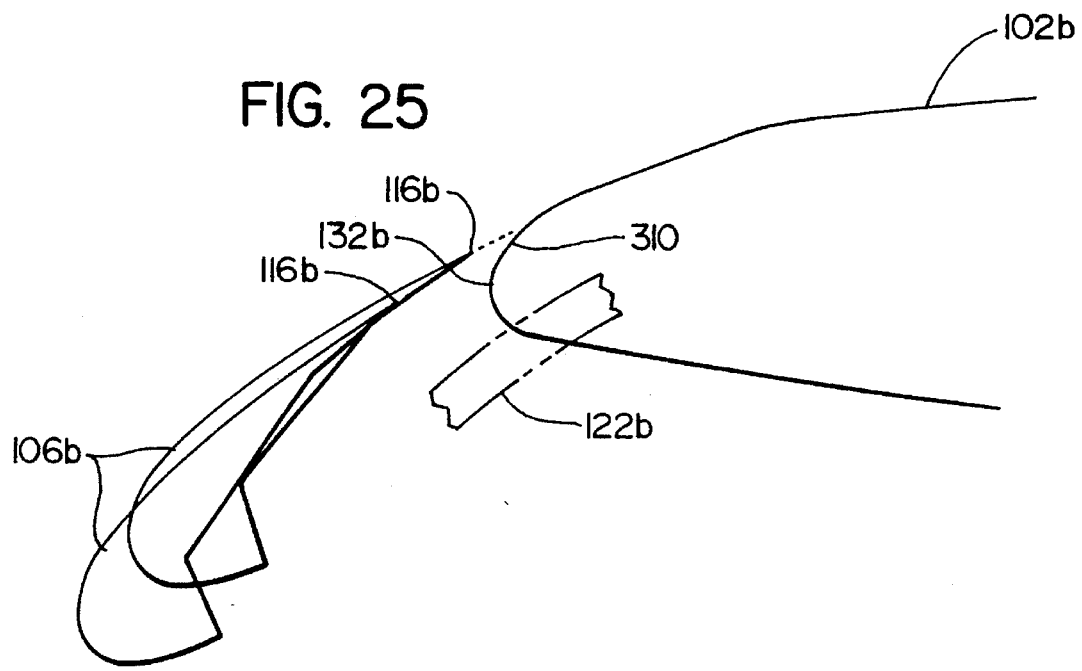
FIG. 25 is a view similar to FIG. 22, but showing the third embodiment, with the slat in both the take-off/climb position, and in the high lift position.

A third embodiment of the present invention is shown in FIGS. 23 through 25. Components of this third embodiment which are similar to the components of the other two embodiments are given like numerical designations with a "b" suffix distinguishing those of this third embodiment.

This third embodiment is similar to the second embodiment in that the take-off and climb configuration, a slot or gap 300b is formed between the trailing edge 116b of the slat 106b and the fixed wing concealed surface 132b. As in the second embodiment, at the span-wise area of the carrier track 122a, this gap 300b is closed. This is accomplished by providing at the slat trailing edge 116b by providing a rearward extension 310 at the location of the carrier track 122b.

The preferred means of accomplishing this would is to simply have the extension 310 fixedly attached to or made integral with the upper skin of the slat 106b, with the extension 310 arranged so that it blends into the surface contours of the upper fixed wing surface in the cruise position. An alternative would be to provide the extension 310 so as to have a stowed position within the trailing edge portion of the slat 106b so than it is concealed when the slat 106b is in its retracted cruise configuration, but is extended in the take-off/climb position.

It is believed that the mode of operation of this third embodiment is readily understandable from the previous discussion of the first embodiment. In the take-off and climb configuration shown in FIG. 24, the air flow upwardly toward the slot or gap 300b is diverted in the area of the extension 310 so as to reduce the drag otherwise created by the carrier track 122b. In the landing configuration of FIGS. 23 and 25 there is a gap along the entire leading edge of the fixed wing.

It is to be understood that various modifications could be made to the present invention without departing from the basic teachings thereof.

What is claimed:

1. A slat/fixed wing combination, comprising:
   a. a fixed wing having a leading edge portion, an upper surface comprising a concealed forward nose and upper surface portion, and a main upper surface portion located rearwardly of the concealed forward nose and upper surface portion, and also a lower surface;
   b. a slat having a leading edge, a trailing edge, and a forward and upper surface portion extending from said leading edge to said leading edge portion of the fixed wing in a manner to be movable between three positions, namely:
  i. a first cruise position where the slat is immediately adjacent to the fixed wing leading edge portion to conceal said concealed forward nose and upper surface portion;
  ii. a second intermediate take-off/climb position where the slat is located forwardly of the cruise position, and the trailing edge of the slat is in contact with, or closely adjacent to, said forward concealed nose and upper surface portion; and
  iii. a third high lift position where the slat is moved forwardly and downwardly from the second position with the trailing edge of the slat forming an aerodynamic high lift position gap with the leading edge portion of the fixed wing;
c. said fixed wing having a fixed wing outer contour envelope contained within said upper and lower surfaces of said fixed wing;
d. a slat actuating mechanism comprising a substantially circularly curved carrier track means having a forward end to which the slat is mounted with a substantially fixed angular orientation relative to said track means, said track means having an arcuate lengthwise track axis extending in a substantial curve along said track means, said track means being mounted for movement along said track axis from a rear track position where the flap is positioned in the first cruise position, to an intermediate track position where the slat is positioned in said second intermediate position, and a forward track position where the slat is located in said third high lift position;
e. said track means having a track structural and operating envelope having a maximum width dimension generally perpendicular to said lengthwise track axis and a maximum length dimension extending along said lengthwise track axis, said track means being arranged relative to said outer surface contour envelope of said fixed wing in a manner that in the cruise position the track structural envelope is positioned substantially entirely within the outer surface contour envelope of the fixed wing;
f. the leading edge portion of the fixed wing having a horizontal lengthwise dimension extending from a most forward nose surface portion of the leading edge portion of the fixed wing in a cordwise direction to a location of the trailing edge of the slat in the first cruise configuration, said fixed wing having a first vertical thickness dimension of the fixed wing at a first vertical thickness location which is spaced from the most forward nose surface portion rearwardly 12½% of the lengthwise dimension, said first fixed wing vertical dimension being at least as great as 63% of the total vertical thickness dimension of the slat/wing combination at said first vertical thickness location when in the first cruise position.

2. The combination as recited in claim 1, wherein the lengthwise axis of the carrier track means has a center of curvature for said track means, said trailing edge of the slat has three trailing edge point locations at said first, second and third positions of the slat that define a trailing edge arcuate path of travel for the trailing edge of the slat, which trailing edge arcuate path has a center of curvature for the slat trailing edge path of travel, and a leading edge point of said slat has three leading edge point locations at the first, second and third positions of the slat, and the three leading edge locations of the slat define a leading edge arcuate path of travel having a center of curvature of the path of travel of the leading edge of the slat, said slat/fixed wing combination being arranged so that the center of curvature of the track, the center of curvature of the slat trailing edge path of travel, and the center of curvature of the slat leading edge path of travel are all coincident.

3. The combination as recited in claim 1, wherein with the slat in the second intermediate position, said trailing edge of the slat is positioned in sealing relationship with said forward nose and upper concealed surface portion.

4. A slat/fixed wing combination, comprising:
a. a fixed wing having a leading edge portion, an upper surface comprising a concealed forward nose and upper surface portion having an aerodynamically fixed surface contour, and a main upper surface portion located rearwardly of the concealed forward nose and upper surface portion, and also a lower surface;
b. a slat having a leading edge, a trailing edge, and a forward and upper fixed surface portion extending from said leading edge to said trailing edge, said slat being mounted to said leading edge portion of the fixed wing in a manner to be movable between three positions, namely:
  i. a first cruise position where the slat is immediately adjacent to the fixed wing leading edge portion to conceal said concealed forward nose and upper surface portion;
  ii. a second intermediate take-off/climb position where the slat is located forwardly of the cruise position, and the trailing edge of the slat is in contact with, or closely adjacent to, said forward concealed nose and upper surface portion; and
  iii. a third high lift position where the slat is moved forwardly and downwardly from the second position with the trailing edge of the slat forming an aerodynamic high lift position gap with the leading edge portion of the fixed wing, said forward and upper surface portion of the slat having a fixed surface contour at all of said first, second and third positions;
c. said fixed wing having a fixed wing outer contour envelope contained within said upper and lower surfaces of said fixed wing;
d. a slat actuating mechanism comprising a substantially circularly curved carrier track means having a forward end to which the slat is mounted with a substantially fixed angular orientation relative to said track means, said track means having an arcuate lengthwise track axis extending in a substantial curve along said track means, said track means being mounted for movement along said track axis from a rear track position where the flap is positioned in the first cruise position, to an intermediate track position where the slat is positioned in said second intermediate position, and a forward track position where the slat is located in said third high lift position;
e. said track means having a track structural and operating envelope having a maximum width dimension generally perpendicular to said lengthwise track axis and a maximum length dimension extending along said lengthwise track axis, said track means being arranged relative to said outer surface contour envelope of said fixed wing in a manner that in the cruise position the track structural envelope is positioned substantially entirely within the outer surface contour envelope of the fixed wing;

f. the lengthwise axis of the carrier track means having a center of curvature for said track means, said trailing edge of the slat having three trailing edge point locations at said first, second and third positions of the slat that define a trailing edge arcuate path of travel for the trailing edge of the slat, which trailing edge arcuate path has a center of curvature for the slat trailing edge path of travel, and a leading edge point of said slat having three leading edge point locations at the first, second and third positions of the slat, and the three leading edge locations of the slat defining a leading edge arcuate path of travel having a center of curvature of the path of travel of the leading edge of the slat, said slat/fixed wing combination being arranged so that the center of curvature of the track, the center of curvature of the slat trailing edge path of travel, and the center of curvature of the slat leading edge path of travel are all coincident;

g. the forward nose and upper surface being contoured with a rear surface portion thereof being positioned at the trailing edge point location in the first cruise position of the slat, and with an intermediate surface portion thereof being positioned at the trailing edge point location at the second intermediate take-off/climb position of the slat.

5. The combination as recited in claim 4, wherein with the slat in the second intermediate position, said trailing edge of the slat is positioned in sealing relationship with said forward nose and upper concealed surface portion.

6. The combination as recited in claim 5, wherein the concealed forward nose and upper surface portion of the fixed wing is shaped aerodynamically so that with the slat in third high lift position, pressure over the concealed forward nose and upper surface portion is at a peak negative pressure at a most forward location of said concealed forward nose and upper surface portion, and is at a lower negative pressure at a location rearwardly of a half-way location along a lengthwise dimension of said concealed forward and upper surface portion, and the pressure drop over a forward half of the concealed forward and upper surface portion is greater than the pressure drop over a back_half portion of the concealed forward and upper surface portion.

7. The combination as recited in claim 1, wherein the vertical thickness dimension of said fixed wing at said first vertical thickness location is no greater than about 76% of the vertical thickness dimension of the slat/fixed wing combination at said first vertical thickness location.

8. The combination as recited in claim 1, there is a second vertical thickness dimension of the fixed wing at a second vertical thickness location which is spaced from the most forward nose surface portion rearwardly 25% of the lengthwise dimension, said first fixed wing vertical dimension being at least as great as 77% of the total vertical thickness dimension of the slat/wing combination at said first vertical thickness location.

9. The combination as recited in claim 8, wherein the vertical thickness dimension of said fixed wing at said second vertical thickness location is no greater than about 83% of the vertical thickness dimension of the slat/fixed wing combination at said first vertical thickness location.

10. The combination as recited in claim 9, wherein the vertical thickness dimension of said fixed wing at said first vertical thickness location is no greater than about 76% of the vertical thickness dimension of the slat/fixed wing combination at said first vertical thickness location.

11. The combination as recited in claim 1, wherein the concealed forward nose and upper surface portion of the fixed wing is shaped aerodynamically so that with the slat in the third high lift position, pressure over the concealed forward nose and upper surface portion is at a peak negative pressure at a most forward location of said concealed forward nose and upper surface portion, and is at a lower negative pressure at a location rearwardly of a half-way location along a lengthwise dimension of said concealed forward and upper surface portion, and the pressure drop over a forward half of the concealed forward and upper surface portion is greater than the pressure drop over a back half portion of the concealed forward and upper surface portion.

12. The combination as recited in claim 11, wherein the negative pressure curve over the concealed forward nose and upper surface portion drops below peak negative pressure at the back half portion of the concealed forward nose and upper surface portion.

13. The combination as recited in claim 8, wherein the vertical thickness dimension of said fixed wing at said first vertical thickness location is no greater than about 76% of the vertical thickness dimension of the slat/fixed wing combination at said first vertical thickness location.

14. A slat/fixed wing combination, comprising:

a. a fixed wing having a leading edge portion, an upper surface comprising a concealed forward nose and upper surface portion, and a main upper surface portion located rearwardly of the concealed forward nose and upper surface portion, and also a lower surface;

b. a slat having a leading edge, a trailing edge, and a forward and upper surface portion extending from said leading edge to said trailing edge, said slat being mounted to said leading edge portion of the fixed wing in a manner to be movable between three positions, namely:

i. a first cruise position where the slat is immediately adjacent to the fixed wing leading edge portion to conceal said concealed forward nose and upper surface portion;

ii. a second intermediate take-off/climb position where the slat is located forwardly of the cruise position, the trailing edge of the slat is spaced from said forward concealed nose and upper surface portion to form an aerodynamic take-off/climb gap;

iii. a third high lift position where the slat is moved forwardly and downwardly from the second position with the trailing edge of the slat forming an aerodynamic high lift position gap with the leading edge portion of the fixed wing;

c. said fixed wing having a fixed wing outer contour envelope contained within said upper and lower surfaces of said fixed wing;

d. a slat actuating mechanism comprising a substantially circularly curved carrier track means having a forward end to which the slat is mounted with a substantially fixed angular orientation relative to said track means, said track means having an arcuate lengthwise track axis extending in a substantial curve along said track means, said track means being mounted for movement along said track axis from a rear track position where the flap is positioned in the first cruise position, to an intermediate track position where the slat is positioned in said second intermediate position, and a forward track position where the slat is located in said third high lift position;

e. said track means having a track structural and operating envelope having a maximum width dimension generally perpendicular to said lengthwise track axis and a maximum length dimension extending along said lengthwise track axis, said track means being arranged relative to said outer surface contour envelope of said fixed wing in a manner that in the cruise position the track structural envelope is positioned substantially entirely within the outer surface contour envelope of the fixed wing;

f. gap closure means which comprises a raised surface portion of said concealed forward nose and upper surface portion of said fixed wing, and is located at a location of said slat actuating mechanism at said take-off/climb gap, said gap closure means being contoured to be located outwardly of the concealed forward nose and upper surface portion so that with the slat in the second position, said gap closure means closes a portion of said aerodynamic take-off/climb gap at the location of the slat actuating mechanism.

15. The combination as recited in claim 11, wherein there is a second vertical thickness dimension of the fixed wing at a second vertical thickness location which is spaced from the most forward nose surface portion rearwardly 25% of the lengthwise distance, said first fixed wing vertical dimension being at least as great as 77% of the total vertical thickness dimension of the slat/wing combination at said first vertical thickness location.

16. The combination as recited in claim 15, wherein the vertical thickness dimension of said fixed wing at said first vertical thickness location is no greater than about 76% of the vertical thickness dimension of the slat/fixed wing combination at said first vertical thickness location.

17. A slat/fixed wing combination, comprising:

a. a fixed wing having a leading edge portion, an upper surface comprising a concealed forward nose and upper surface portion, and a main upper surface portion located rearwardly of the concealed upper surface portion, and also a lower surface;

b. a slat having a leading edge, a trailing edge, a forward and upper surface portion extending from said leading edge to said trailing edge, said slat being mounted to said leading edge portion of the fixed wing in a manner to be movable between three positions, namely:
  i. a first cruise position where the slat is immediately adjacent to the fixed wing leading edge portion to conceal said concealed forward nose and upper surface portion;
  ii. a second intermediate take-off/climb position where the slat is located forwardly of the cruise position, and the trailing edge of the slat is proximate to and spaced from said forward nose and upper concealed surface portion to form an aerodynamic take-off/climb gap; and
  iii. a third high lift position where the slat is moved forwardly and downwardly from the second position with the trailing edge of the slat forming a high lift gap with the leading edge portion of the fixed wing;

c. a slat actuating mechanism comprising a forward end to which the slat is mounted, said actuating mechanism being mounted for movement from a cruise position to an intermediate position where the actuating mechanism extends into said aerodynamic take-off/climb gap;

d. a gap closure means which comprises a raised surface portion of said concealed forward nose and upper surface portion of said fixed wing, and is located at a location of said slat actuating mechanism at said take-off/climb gap, said gap closure means being contoured to be located outwardly of the concealed forward nose and upper surface portion so that with the slat in the second position, said gap closure means closes a portion of said aerodynamic take-off/climb gap at the location of the slat actuating mechanism.

18. The combination as recited in claim 15, wherein the vertical thickness dimension of said fixed wing at said second vertical thickness location is no greater than about 83% of the vertical thickness dimension of the slat/fixed wing combination of said first vertical thickness location.

19. The combinations as recited in claim 18, wherein the vertical thickness dimension of said fixed wing at said first vertical thickness location is no greater than about 76% of the vertical thickness dimension of the slat/fixed wing combination at said first vertical thickness location.

20. The combination as recited in claim 11, wherein the vertical thickness dimension of said fixed wing at said first vertical thickness location is no greater than about 76% of the vertical thickness dimension of the slat/fixed wing combination at said first vertical thickness location.

21. A slat/fixed wing combination, comprising:

a. a fixed wing having a leading edge portion, an upper surface comprising a concealed forward nose and upper surface portion, and a main upper surface portion located rearwardly of the concealed forward nose and upper surface portion, and also a lower surface;

b. a slat having a leading edge, a trailing edge, and a forward and upper surface portion extending from said leading edge to said trailing edge, said slat being mounted to said leading edge portion of the fixed wing in a manner to be movable between three positions, namely:
  i. a first cruise position where the slat is immediately adjacent to the fixed wing leading edge portion to conceal said concealed forward nose and upper surface portion;
  ii. a second intermediate take-off/climb position where the slat is located forwardly of the cruise position, the trailing edge of the slat is spaced from said forward concealed nose and upper surface portion to form an aerodynamic take-off/climb gap;
  iii. a third high lift position where the slat is moved forwardly and downwardly from the second position with the trailing edge of the slat forming an aerodynamic high lift position gap with the leading edge portion of the fixed wing;

c. said fixed wing having a fixed wing outer contour envelope contained within said upper and lower surfaces of said fixed wing;

d. a slat actuating mechanism comprising a substantially circularly curved carrier track means having a forward end to which the slat is mounted with a substantially fixed angular orientation relative to said track means, said track means having an arcuate lengthwise track axis extending in a substantial curve along said track means, said track means being mounted for movement along said track axis from a rear track position where the flap is positioned in the first cruise position, to an intermediate track position where the slat is positioned in said second intermediate position, and a forward track position where the slat is located in said third high lift position;

e. said track means having a track structural and operating envelope having a maximum width dimension generally perpendicular to said lengthwise track axis and a maximum length dimension extending along said lengthwise track axis, said track means being arranged relative to said outer surface contour envelope of said fixed wing in a manner that in the cruise position the track structural envelope is positioned substantially entirely within the outer surface contour envelope of the fixed wing;

f. gap closure means which comprises an extension of said slat which locally extends rearwardly beyond the trailing edge of the slat at said slat trailing edge at the location of the actuating mechanism and is located at a location of said slat actuating mechanism at said take-off/climb gap, said gap closure means being arranged so that with the slat in the second position, said gap closure means closes a portion of said aerodynamic take-off/climb gap at the location of the slat actuating mechanism.

22. A slat/fixed wing combination, comprising:

a. a fixed wing having a leading edge portion, an upper surface comprising a concealed forward nose and upper surface portion, and a main upper surface portion located rearwardly of the concealed upper surface portion, and also a lower surface;

b. a slat having a leading edge, a trailing edge, a forward and upper surface portion extending from said leading edge to said trailing edge, said slat being mounted to said leading edge portion of the fixed wing in a manner to be movable between three positions, namely:

i. a first cruise position where the slat is immediately adjacent to the fixed wing leading edge portion to conceal said concealed forward nose and upper surface portion;

ii. a second intermediate take-off/climb position where the slat is located forwardly of the cruise position, and the trailing edge of the slat is proximate to and spaced from said forward nose and upper concealed surface portion to form an aerodynamic take-off/climb gap; and iii. a third high lift position where the slat is moved forwardly and downwardly from the second position with the trailing edge of the slat forming a high lift gap with the leading edge portion of the fixed wing;

c. a slat actuating mechanism comprising a forward end to which the slat is mounted, said actuating mechanism being mounted for movement from a cruise position to an intermediate position where the actuating mechanism extends into said aerodynamic take-off/climb gap;

d. gap closure means which comprises an extension of said slat which locally extends rearwardly beyond the trailing edge of the slat at said slat trailing edge at the location of the actuating mechanism and is located at a location of said slat actuating mechanism at said take-off/climb gap, said gap closure means being arranged so that with the slat in the second position, said gap closure means closes a portion of said aerodynamic take-off/climb gap at the location of the slat actuating mechanism.

23. A slat/fixed wing combination, comprising:

a. a fixed wing having a leading edge portion, an upper surface comprising a concealed forward nose and upper surface portion, and a main upper surface portion located rearwardly of the concealed forward nose and upper surface portion, and also a lower surface;

b. a slat having a leading edge, a trailing edge, and a forward and upper surface portion extending from said leading edge to said trailing edge, said slat being mounted to said leading edge portion of the fixed wing in a manner to be movable between three positions, namely:

i. a first cruise position where the slat is immediately adjacent to the fixed wing leading edge portion to conceal said concealed forward nose and upper surface portion;

ii. a second intermediate take-off/climb position where the slat is located forwardly of the cruise position, and the trailing edge of the slat is in contact with, or closely adjacent to, said forward concealed nose and upper surface portion; and iii. a third high lift position where the slat is moved forwardly and downwardly from the second position with the trailing edge of the slat forming an aerodynamic high lift position gap with the leading edge portion of the fixed wing;

c. said fixed wing having a fixed wing outer contour envelope contained within said upper and lower surfaces of said fixed wing;

d. a slat actuating mechanism comprising a substantially circularly curved carrier track means having a forward end to which the slat is mounted with a substantially fixed angular orientation relative to said track means, said track means having an arcuate lengthwise track axis extending in a substantial curve along said track means, said track means being mounted for movement along said track axis from a rear track position where the flap is positioned in the first cruise position, to an intermediate track position where the slat is positioned in said second intermediate position, and a forward track position where the slat is located in said third high lift position;

e. said track means having a track structural and operating envelope having a maximum width dimension generally perpendicular to said lengthwise track axis and a maximum length dimension extending along said lengthwise track axis, said track means being arranged relative to said outer surface contour envelope of said fixed wing in a manner that in the cruise position the track structural envelope is positioned substantially entirely within the outer surface contour envelope of the fixed wing;

f. the concealed forward nose and upper surface portion of the fixed wing being shaped aerodynamically so that with the slat in the third high lift position, pressure over the concealed forward nose and upper surface portion is at a peak negative pressure at a most forward location of said concealed forward nose and upper surface portion, and is at a lower negative pressure at a location along rearwardly of a half-way location a lengthwise dimension of said concealed forward and upper surface portion, and the pressure drop over a forward half of the concealed forward and upper surface portion is greater than the pressure drop over a back half portion of the concealed forward and upper surface portion.

24. The combination as recited in claim 23, wherein the negative pressure curve over the concealed forward nose and upper surface portion at said half-way location drops below the negative pressure at the rearmost location of the concealed forward nose and upper surface portion.

25. The combination as recited in claim 12, wherein there is a second vertical thickness dimension of the fixed wing at a second vertical thickness location which is spaced from the most forward nose surface portion rearwardly 25% of the lengthwise distance, said first fixed wing vertical dimension being at least as great as 77% of the total vertical thickness dimension of the slat/wing combination at said first vertical thickness location.

26. The combination as recited in claim 25, wherein the vertical thickness dimension of said fixed wing at said second vertical thickness location is no greater than about 83% of the vertical thickness dimension of the slat/fixed wing combination at said first vertical thickness location.

27. The combination as recited in claim 25, wherein the vertical thickness dimension of said fixed wing at said first vertical thickness location is no greater than about 76% of the vertical thickness dimension of the slat/fixed wing combination at said first vertical thickness location.

28. The combination as recited in claim 25, wherein the vertical thickness dimension of said fixed wing at said first vertical thickness location is no greater than about 76% of the vertical thickness dimension of the slat/fixed wing combination at said first vertical thickness location.

29. The combination as recited in claim 12, wherein the vertical thickness dimension of said fixed wing at said first vertical thickness location is no greater than about 76% of the vertical thickness dimension of the slat/fixed wing combination at said first vertical thickness location.

* * * * *